United States Patent
Smith et al.

(10) Patent No.: US 6,599,194 B1
(45) Date of Patent: Jul. 29, 2003

(54) HOME VIDEO GAME SYSTEM WITH HARD DISK DRIVE AND INTERNET ACCESS CAPABILITY

(76) Inventors: Darren Smith, 4820 150th Ave. NE., Redmond, WA (US) 98052; Scott Elliott, 4820 150th Ave., NE., Federal Way, WA (US) 98052; David J. McCarten, 4820 150th Ave., NE., Bothell, WA (US) 98052

(*) Notice: Subject to any disclaimer, the term of this patent is extended or adjusted under 35 U.S.C. 154(b) by 0 days.

(21) Appl. No.: 09/288,293

(22) Filed: Apr. 8, 1999

Related U.S. Application Data

(60) Provisional application No. 60/099,608, filed on Sep. 8, 1998, provisional application No. 60/110,622, filed on Dec. 2, 1998, and provisional application No. 60/121,183, filed on Feb. 22, 1999.

(51) Int. Cl.[7] ................................. A63F 13/00
(52) U.S. Cl. ..................... 463/30; 463/42; 463/43
(58) Field of Search .................. 463/39–44, 29–33

(56) References Cited

U.S. PATENT DOCUMENTS

| | | | | |
|---|---|---|---|---|
| 4,247,106 A | * | 1/1981 | Jeffers et al. | 273/237 |
| 4,296,476 A | * | 10/1981 | Mayer et al. | |
| 4,299,386 A | * | 11/1981 | Kulesza et al. | 273/85 G |
| 5,007,649 A | * | 4/1991 | Richardson | |
| 5,251,909 A | | 10/1993 | Reed et al. | |
| 5,313,303 A | * | 5/1994 | Ersoz et al. | 348/439 |
| 5,350,176 A | | 9/1994 | Hochstein et al. | |
| 5,368,484 A | * | 11/1994 | Copperman et al. | |
| 5,377,997 A | * | 1/1995 | Wilden et al. | |
| 5,423,554 A | * | 6/1995 | Davis | |
| 5,481,542 A | | 1/1996 | Logston et al. | |
| 5,497,479 A | | 3/1996 | Hornbuckle | |
| 5,538,255 A | | 7/1996 | Barker | |
| 5,558,339 A | | 9/1996 | Perlman | |
| 5,624,316 A | | 4/1997 | Roskowski et al. | |
| 5,630,757 A | | 5/1997 | Gagin et al. | |
| 5,668,950 A | | 9/1997 | Kikuchi et al. | |
| 5,685,775 A | | 11/1997 | Bakoglu et al. | |
| 5,695,401 A | * | 12/1997 | Lowe et al. | |
| 5,746,656 A | * | 5/1998 | Bezick et al. | |

(List continued on next page.)

OTHER PUBLICATIONS

Webtv Networks, Inc. webtv http:www.WebTV.net All Pages, Dec. 1995.*
Aquericee Home Computer Catalog, 1983.*
1080 Block=72Mb Memory Card.*
Ultimate Game Machine Listing of Well–known PC Hardware.*
Freier et al., "The SSL Protocol Version 3.0", Transport Layer Security Working Group, Internet–Draft, http://cui-sung.unige.ch/memories/Hugentobler/draft302.txt.gz, Nov. 18, 1996, pp. 1–58.
Henry, "Local Company Big Player in Electronic Games", The Sun, Baltimore, MD., Nov. 1, 1998, 3 pages.

Primary Examiner—Michael O'Neill

(57) ABSTRACT

An existing video game system is modified to include additional communication and storage capability via a modem and hard disk drive. The modification may involve the use of an expansion device coupled to a video game system port. A cable TV tuner is also included in the expansion device to assist in providing a unique picture-in-picture video capability. TV signals are coupled to the expansion device via the RF input from either cable TV or off-air signals. These RF signals are blended with the output signals from the video game system. A user may, for example, watch TV while viewing overlay information from the video game console. A user may receive a TV channel guide downloaded via the Internet, spot a program which the user desires to view and immediately access, via an IR input, the desired channel through the expansion device TV tuner. A user may also watch TV while simultaneously logging onto the Internet. A hard drive permits downloading from the Internet of entire games.

54 Claims, 16 Drawing Sheets

U.S. PATENT DOCUMENTS

| | | | |
|---|---|---|---|
| 5,752,883 A | * | 5/1998 | Butcher et al. |
| 5,762,555 A | | 6/1998 | Crump et al. |
| 5,791,992 A | | 8/1998 | Crump et al. |
| 5,828,862 A | * | 10/1998 | Singkornrat et al. |
| 5,841,980 A | | 11/1998 | Waters et al. |
| 5,876,286 A | * | 3/1999 | Lee |
| 5,890,963 A | * | 4/1999 | Yen |
| 5,923,379 A | * | 7/1999 | Patterson .................... 348/565 |
| 5,926,175 A | * | 7/1999 | Sturgeon et al. |
| 6,011,592 A | * | 1/2000 | Vaughan et al. |
| 6,018,712 A | | 1/2000 | Pactong |
| 6,018,720 A | | 1/2000 | Fujimoto |
| 6,022,274 A | * | 2/2000 | Takeda et al. ................ 463/29 |
| 6,038,316 A | | 3/2000 | Dwork et al. |
| 6,055,314 A | | 4/2000 | Spies et al. |
| 6,084,638 A | * | 7/2000 | Hare et al. |
| 6,097,441 A | * | 8/2000 | Allport ....................... 348/552 |
| 6,108,420 A | | 8/2000 | Larose et al. |
| 6,166,772 A | * | 12/2000 | Voltz et al. |
| 6,169,976 B1 | | 1/2001 | Colosso |
| 6,219,041 B1 | * | 4/2001 | Sturgeon et al. |
| 6,233,567 B1 | | 5/2001 | Cohen |

* cited by examiner

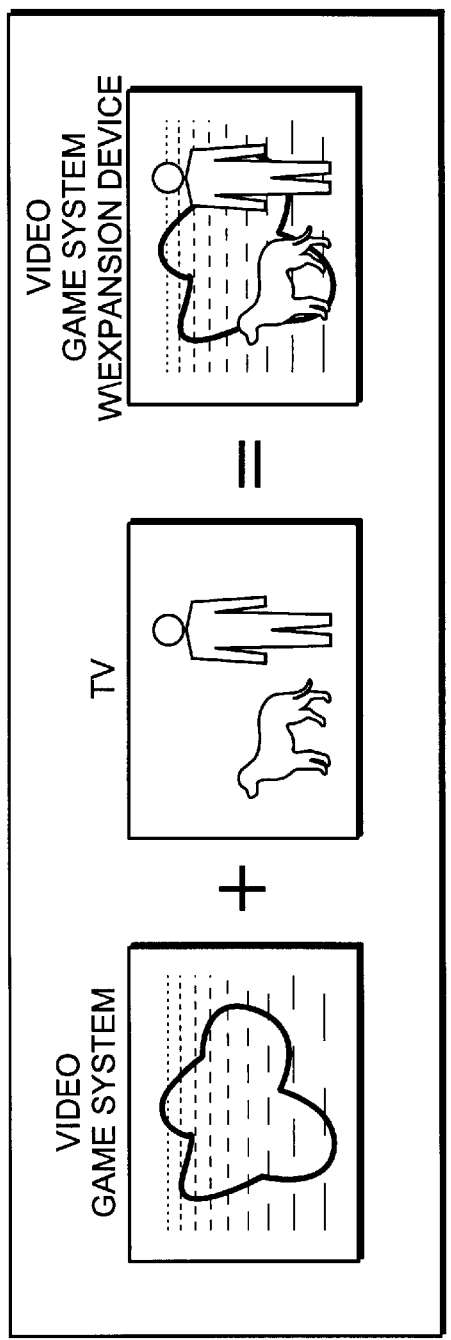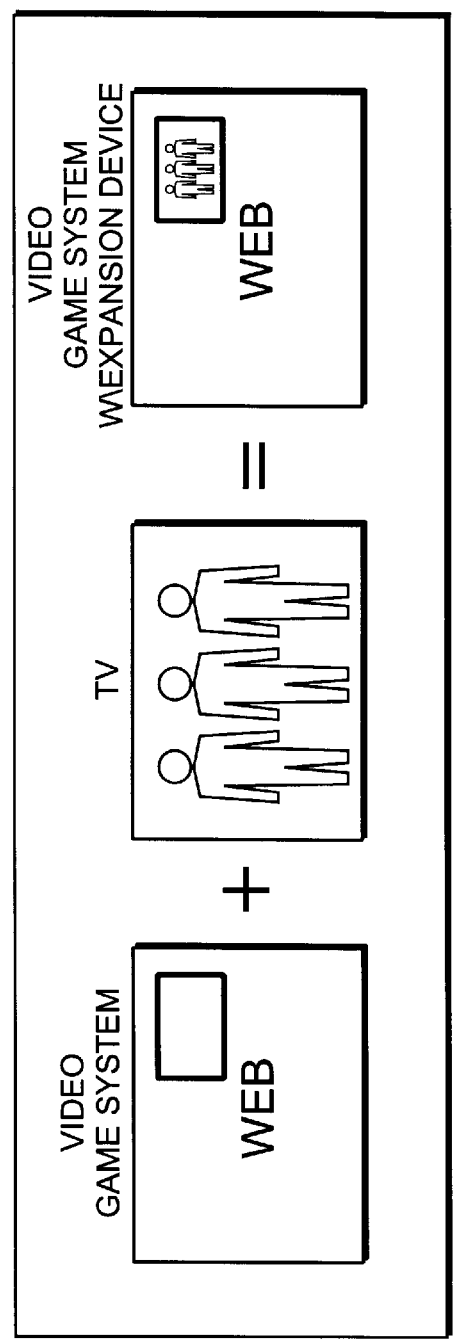

Fig. 8

| NAME | R/W | DESCRIPTION |
|---|---|---|
| DISK STATUS | R | READ: DISK STATUS |
| LBA WRITE ADDRESS | W | WRITING TO THIS ADDRESS CAUSES THE CONTENTS OF THE SECTOR BUFFER TO BE WRITTEN TO THE LBA POINTED TO BY THIS LBA WRITE ADDRESS. THE BUFFER COUNTER IS RESET. |
| LBA READ ADDRESS | W | WRITING TO THIS ADDRESS CAUSES THE CONTENTS OF THE LBA POINTED TO BY THIS LBA READ ADDRESS TO BE READ INTO THE SECTOR BUFFER. THE BUFFER COUNTER IS RESET. |
| $I^2C$ S0' OWN ADDRESS REGISTER | R/W | ES0=0 READ/WRITE: OWN ADDRESS |
| $I^2C$ S0 DATA REGISTER | R/W | ES0=1 READ/WRITE: $I^2C$ DATA |
| $I^2C$ S1 CONTROL STATUS REGISTER | R/W | READ: STATUS WRITE: CONTROL |
| $I^2C$ S2 CLOCK REGISTER | R/W | READ/WRITE: CLOCK SCALE VALUE |
| $I^2C$ S3 INTERRUPT VECTOR | R/W R | ES0=0: READ/WRITE: INTERRUPT VECTOR ES0=1: READ: INTERRUPT VECTOR ACK CYCLE |
| MODEM IN | R | READ: MODEM STATUS & DATA |
| MODEM OUT | R/W | WRITE MODEM DATA READ MODEM OUT STATUS |
| MODEM OUT CONTROL | W | SEPARATE REGISTER TO CONTROL MODEM WRITE FUNCTIONS |
| SECTOR BUFFER | R/W | 512 BYTE SECTOR BUFFER FOR THE HARD DRIVE. THE POINTER INTO THIS BUFFER IS INCREMENTED BY FOUR BYTES EACH TIME THE BUFFER IS READ OR WRITTEN. AFTER 512 BYTES ARE ACCESSED THE POINTER WRAPS AROUND. |
| VIDEO/INTERCAST SPACE | R/W | |
| INTERRUPT STATUS REGISTER | R/W | READ: EXPANSION DEVICE SUPPORTS A SINGLE, 32 BIT INTERRUPT STATUS REGISTER FOR THE VIDEO GAME SYSTEM. VARIOUS BITS WILL BE ALLOCATED TO PROCESSES AS NEEDED DURING DESIGN. WRITE: INTERRUPT MASK |
| | | |

Fig. 9

| FUNCTION | INT |
|---|---|
| MODEM DATA IN READY | Y |
| MODEM SEND READY | Y |
| RTC ALARM | Y |
| I²C INTERRUPT | Y |
| INTERCAST | Y |
| DISK READ DATA READY | Y |
| DISK WRITE COMPLETED | Y |
| COUNTER AT 0 | N |

HOME VIDEO GAME SYSTEM WITH HARD DISK DRIVE AND INTERNET ACCESS CAPABILITY

This application claims the benefit of provisional applications No. 60/121,183, filed Feb. 22, 1999, No. 60/110,622, filed Dec. 2, 1998 and No. 60/099,608, filed Sep. 8, 1998.

FIELD OF THE INVENTION

The invention generally relates to special purpose, home video game systems. More particularly, the invention relates to a modem and hard disk drive-based enhancement for a home video game system to allow a video game player to dial-up a network service provider and communicate over the service provider's network to access the World Wide Web, send e-mail, play games and/or download executable programs, video and audio data to the system's hard disk drive.

BACKGROUND AND SUMMARY OF THE INVENTION

Over the years, special purpose home video game systems have been (and continue to be) immensely popular, notwithstanding the ever increasing presence of personal computers in households throughout the world. The latest generation of such dedicated video game systems utilize a user's color television to generate exciting game play involving three dimensional game worlds having striking depth and realism involving numerous animated moving objects.

For the virtual millions of game players taking advantage of such low cost, special purpose video game systems, system operation and game play has been characterized by single location, stand alone operation. While home video game systems are designed for more than one player to play using multiple controllers attached to a single video game play console, such dedicated video game systems typically do not permit game play against other remotely located players.

The present invention advantageously converts a heretofore stand alone, special purpose video game system into a network communicating device with bulk storage capacity having numerous enhanced capabilities such as simultaneous game play video and Internet display. As used herein, the "Internet" refers to the vast collection of interconnected networks that all use the TCP/IP protocols as well as the more generic interconnection of two or more networks.

In accordance with one exemplary embodiment of the present invention, an expansion device is connected to an existing video game system port to provide additional communication and storage capability via a modem and hard disk drive. A cable TV tuner is also included in the expansion device to assist in advantageously providing a unique picture-in-picture video capability, and data acquisition from the television vertical blanking interval.

TV signals are coupled to the expansion device via an RF input from either cable TV or a conventional antenna. The TV signals can be generated by a VCR playing a tape, a Direct Broadcast Satellite box instead of a cable box, or can be generated from a camcorder or digital camera. The input may be received from baseband sources. These RF or baseband signals are blended with output signals from the video game system. In this fashion, a user may, for example, watch TV while viewing overlay information from the video game console.

In the exemplary embodiment, the expansion device includes infrared (IR) control. Infrared input processing permits, for example, a TV to be remotely controlled via the IR input signal which is coupled to the expansion device's TV tuner. The IR output is used, for example, to control an associated cable box that may be coupled to the expansion device's RF input. Thus, the IR output may be used to change channels via an associated cable box. The IR output also may be used, for example, to turn the TV power on or to remotely control recording in an associated VCR.

The present invention advantageously provides features not attainable by a conventional PC Internet link. For example, the present invention provides a user with enhanced television capabilities. In accordance with the present invention, a user may receive a TV channel guide downloaded via the Internet, or captured from the data transmitted in the vertical blanking interval of a television signal, spot a program which the user desires to view and immediately access the desired channel, via the IR input, through the expansion device TV tuner. In accordance with another feature of the present invention, channel changing may occur under the control of the expansion device tuner, even if the video game system console is in the process of controlling game play.

The present invention also permits a user to watch TV while simultaneously logging onto the Internet. This feature advantageously allows a user to observe his or her favorite news, sports or entertainment show while waiting for Internet access, or while enjoying a show's Internet-based content (e.g., an interactive chat room feature).

The present invention advantageously permits a video game console to be coupled to the Internet to play multi-player games or alternatively, to dial a friend and play a game involving head-to-head competition. The present invention also enhances the storage capacity of a video game console with a mass storage device such as a hard drive to permit the downloading of entire games into the mass storage device.

In accordance with one exemplary embodiment of the present invention, a known video game system may be advantageously modified to use its processing capability to inexpensively provide Internet access and other audio/video processing functionality. Such a system advantageously makes practical the use of picture-in-picture displays such that the screens of the broadcast television can be displayed along with game play or the Internet.

Additional data and programs necessary for a game can be immediately downloaded through the Internet during game play, thereby making it possible to play a new game related to an original game by use of downloaded data and programs. Additionally, Internet communication becomes possible during game play, thereby conveniently allowing the realization of a game that uses Internet communications without game interruptions.

The above-described features and other advantages of the present invention will become apparent from the following detailed description of the present invention when taken in conjunction with the accompanying drawings.

BRIEF DESCRIPTION OF THE DRAWINGS

FIGS. 6C and 6D show exemplary overlay screen displays which may be generated in accordance with the present invention.

FIG. 8 is an exemplary video game system memory map.

FIG. 9 shows exemplary contents of an interrupt status register.

DETAILED DESCRIPTION OF THE PRESENT PREFERRED EMBODIMENT

Figure 1A:
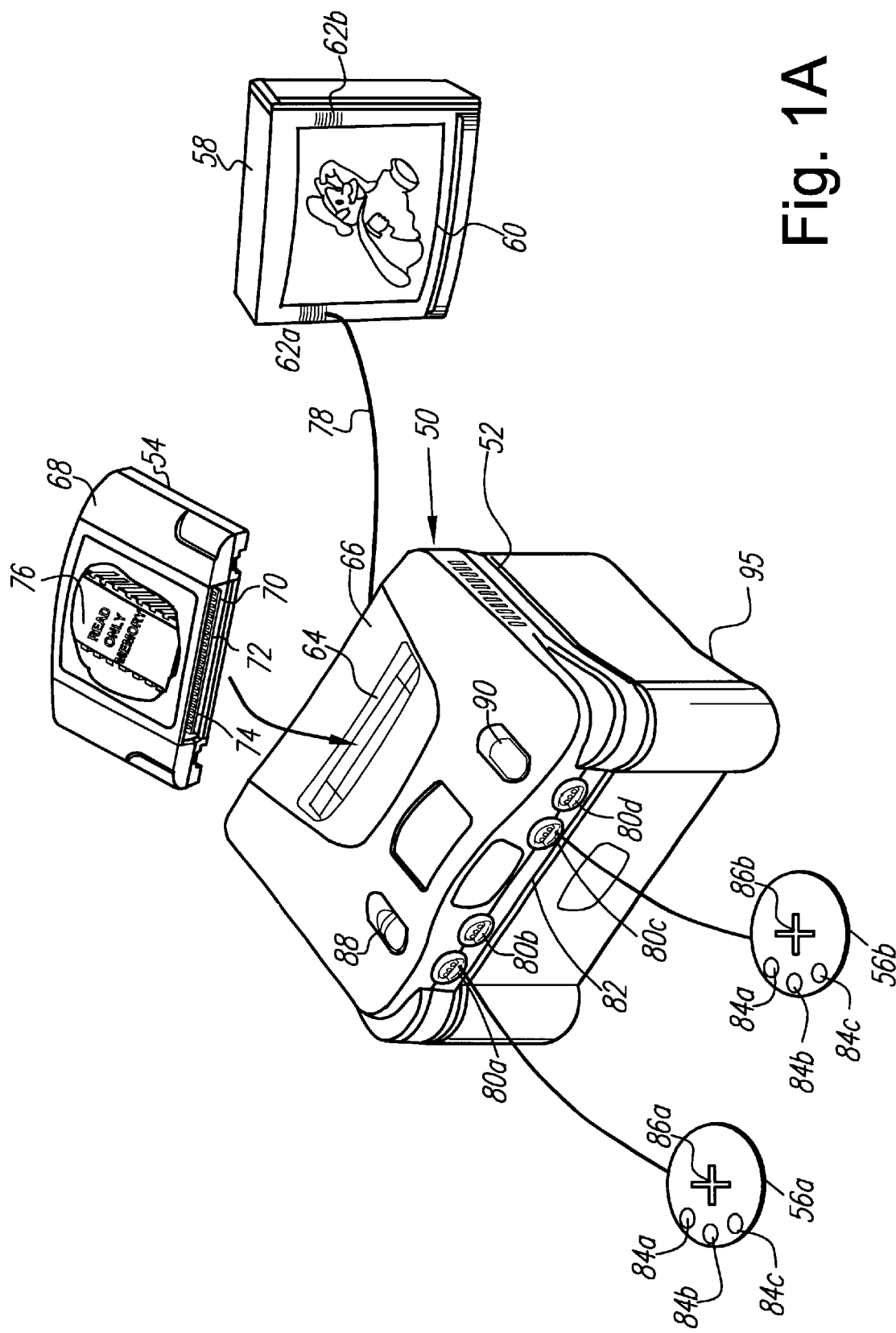
FIG. 1A is a perspective illustration of an exemplary embodiment of the present invention.

FIG. 1A is a perspective view of a presently preferred embodiment of the present invention showing an exemplary video game system 50 connected to a communications and bulk media expansion device 95. In the present exemplary embodiment, the video game system 50 may, for example, be the commercially available Nintendo 64 Video Game System. It should be recognized that the present invention is not limited to use with this exemplary video game system but rather may be adapted for use with a wide range of existing video game systems. Additionally, although the present invention is illustratively described using an add-on expansion device, it is contemplated that the enhanced video game system described herein may alternatively be packaged in a common integrated housing and sold as a single unit.

In accordance with one embodiment of the present invention, expansion device 95 is connected to an expansion port (not shown) located, for example, on the bottom housing portion of video game system 50. Even with the expansion device 95 attached to the video game 50, if a game cartridge 54 is inserted into the console 52, the system will start under control of the program resident in cartridge 54. Otherwise, it will start under control of a program resident on the hard disk drive embodied in expansion device 95 as described below.

Expansion device 95, as shown in FIG. 1A, is preferably mechanically configured to match the appearance of the video game system console 52 and includes a modem and hard disk drive, as well as many other features described in detail below. In accordance with an exemplary embodiment, expansion device 95 allows a video game player to dial up a network service provider and communicate over the service provider's network to access and surf the World Wide Web, send and receive e-mail, send real time messages and chat, play games and/or download video and/or audio information to the expansion device 95's hard disk drive. The expansion device 95 supports disk-based game play with both program and game data storage. The hard disk drive preferably has a capacity of at least one gigabyte. The modem associated with expansion device 95 should preferably be at least V.34 (33.6 baud) in performance and support caller ID, full duplex speaker phone and answering machine functions. Communication expansion device 95 is designed to be connected to external peripherals such as printers and video components and includes a cable TV tuner and video circuitry having picture-in-picture video capability and video overlay capability providing the ability to mix television video and video generated during video game play.

As shown in FIG. 1A, video game system 50 includes a main console 52, a video game storage device 54, and handheld controllers 56a,b (or other user input devices). Main console 52 is connected to a conventional home color television set 58. Television set 58 displays 3D video game images on its television screen 60 and reproduces stereo sound through its speakers 62a,b.

In the illustrative embodiment, the video game storage device 54 is in the form of a replaceable memory cartridge insertable into a slot 64 on a top surface 66 of console 52. A wide variety of alternative program storage media are contemplated by the present invention such as CD ROM, floppy disk, etc. In this exemplary embodiment, video game storage device 54 comprises a plastic housing 68 encasing a printed circuit board 70. Printed circuit board 70 has an edge 72 defining a number of electrical contacts 74. When the video game storage device 68 is inserted into main console slot 64, the cartridge electrical contacts 74 mate with corresponding "edge connector" electrical contacts within the main console. This action electrically connects the storage device printed circuit board 72 to the electronics within main console 52. In this example, at least a "read only memory" chip 76 is disposed on printed circuit board 70 within storage device housing 68. This "read only memory" chip 76 stores instructions and other information pertaining to a particular video game. The read only memory chip 76 for one game cartridge storage device 54 may, for example, contain instructions and other information for an adventure game while another storage device 54 may contain instructions and information to play a car race game, an educational game, etc. If the system is being operated using a game cartridge as opposed to via the expansion device 95, to play one game as opposed to another game, the user of video game system 50 need only plug the appropriate storage device 54 into main console slot 64—thereby connecting the storage device's read only memory chip 76 (and any other circuitry it may contain) to console 52. This enables a computer system embodied within console 52 to access the information contained within read only memory 76, which information controls the console computer system to play the appropriate video game by displaying images and reproducing sound on color television set 58 as specified under control of the read only memory game program information.

In accordance with one exemplary implementation, to set up the video game system 50 for game play, the user first connects console 52 to color television set 58 by hooking a cable 78 between the two. Console 52 produces both "video" signals and "audio" signals for controlling color television set 58. The "video" signals control the images displayed on the television screen 60 and the "audio" signals are played back as sound through television loudspeaker 62. Depending on the type of color television set 58, it may be necessary to connect a conventional "RF modulator" between console 52 and color television set 58. This "RF modulator" (not shown) converts the direct video and audio outputs of console 52 into a broadcast type television signal (e.g., for a television channel 2 or 3) that can be received and processed using the television set's internal "tuner." Other conventional color television sets 58 have direct video and audio input jacks and therefore don't need this intermediary RF modulator.

The user then needs to connect console 52 to a power source. This power source may comprise a conventional AC adapter (not shown) that plugs into a standard home electrical wall socket and converts the house voltage into a lower voltage DC signal suitable for powering console 52. The user may then connect up to 4 hand controllers 56a, 56b to corresponding connectors 80a–80d on main unit front panel 82.

Controllers 56 may take a variety of forms and the controller depicted in FIG. 1A is only for illustrative purposes only. In this example, the controllers 56a,b include various function controlling push buttons such as 84a–c and X-Y switches 86a,b used, for example, to specify the direction (up, down, left or right) that a player controllable character displayed on television screen 60 should move. Other controller possibilities include joysticks, mice pointer controls, a keyboard, and a wide range of other conventional user input devices. The presently preferred controller for use in system 50 is disclosed in FIGS. 6 through 7 of the applicants' assignee's copending application Ser. No. 08/719,019, entitled "Operation Controlling Device and Video Processing System Used Therewith", which application is incorporated herein by reference in its entirety.

The video game system 50 is designed to accommodate expansion to incorporate various types of peripheral devices yet to be specified. This is accomplished by incorporating a programmable peripheral device input/output system which permits device type and status to be specified by program commands.

In the cartridge based mode of operation, a user selects a storage device 54 containing a desired video game, and inserts that storage device into console slot 64 (thereby electrically connecting read only memory 76 and other cartridge electronics to the main console electronics). The user then operates a power switch 88 to turn on the video game system 50 and operates controllers 86a,b (depending on the particular video game being played, up to four controllers for four different players can be used with the illustrative console) to provide inputs to console 52 and thus control video game play. For example, depressing one of push buttons 84a–c may cause the game to start playing. Moving directional switch 86 may cause animated characters to move on the television screen 60 in controllably different directions. Depending upon the particular video game stored within the storage device 54, these various controls 84, 86 on the controller 56 can perform different functions at different times. If the user wants to restart game play from the beginning, or alternatively with certain game programs reset the game to a known continuation point, the user can press a reset button 90.

Figure 1B:
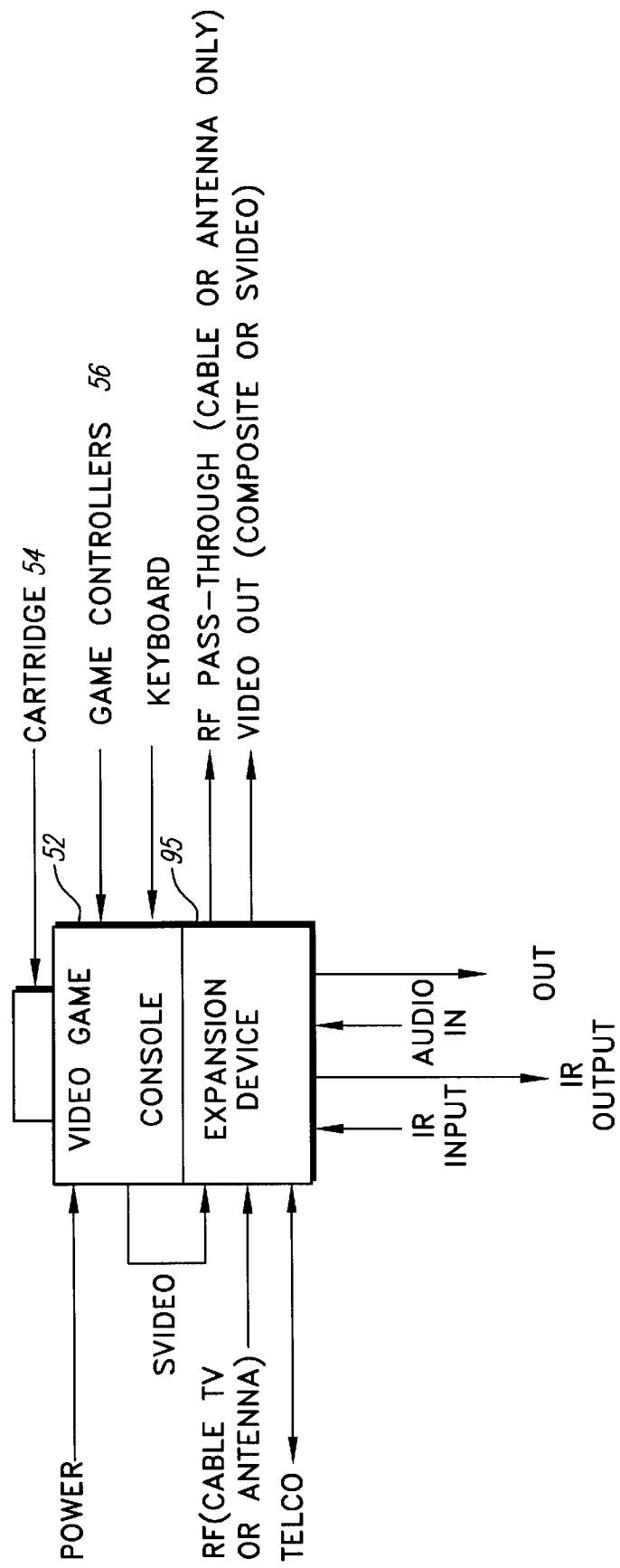
FIG. 1B is a block diagram of part of FIG. 1A.

FIG. 1B schematically shows the input and output signals associated with video game console 52 and expansion device 95. Expansion device 95 is coupled to a video console 52 expansion connector, which preferably is the mirror image of the cartridge connector bus such as exemplary embodiment cartridge connector 154 shown in FIG. 2. As is described further below, expansion device 95 includes a hard drive, a video section with a TV tuner, and a modem. Expansion device 95 receives the highest quality video output signal from video game console 52 (SVIDEO). In the alternative embodiment, where the expansion device and video game system are combined as an integrated unit, the signal from the video game system would be a digital RGB signal instead of an SVIDEO signal. TV signals are coupled to the expansion device 95 via the RF input from either cable TV or off-air signals or via baseband. These RF or baseband signals are blended with the output signals from the video game console 52. In this fashion, a user may watch TV while viewing overlay information from the video game console. RF data may be delivered via the RF input and captured during the video vertical blanking interval if desired.

Figure 2:
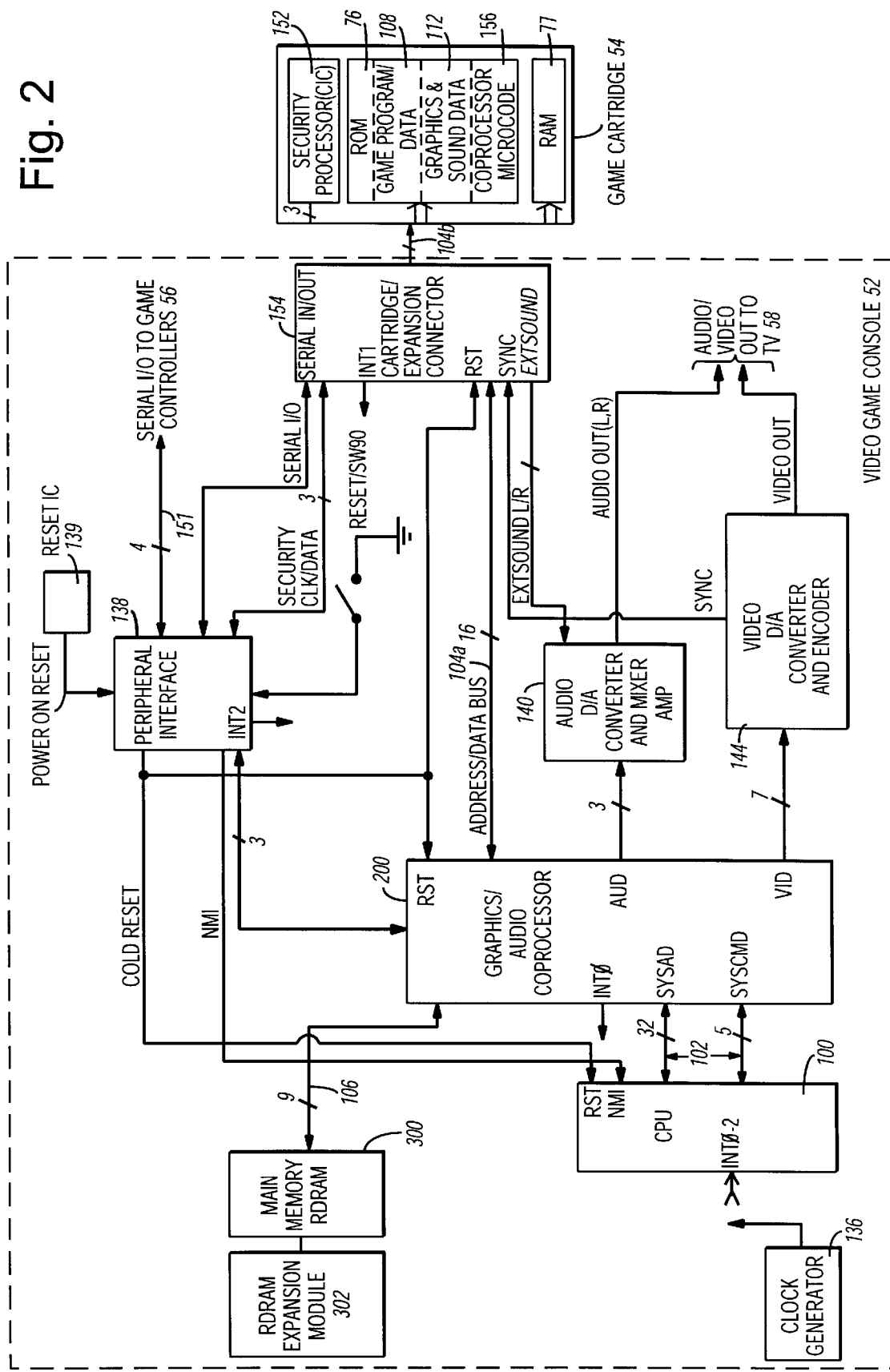
FIG. 2 is a block diagram of an exemplary embodiment of a video game console coupled to a game cartridge.

Video game console 52, as shown in FIGS. 1A, 1B, and 2, is coupled to game controllers 56. In accordance with one embodiment of the present invention, Internet operations may be controlled via a game controller 56 as shown in the above-identified application Ser. No. 08/719,019. However, a preferred Internet access input device is a keyboard which permits convenient text entry operations. A wired keyboard may, for example, be coupled to one of the controller ports 80A–80D shown in FIG. 1A and will preferably interface with the same control logic as a game controller 86. Alternatively, a wireless infrared keyboard or the like could be used as a text entry device.

The expansion device 95 includes a RF pass-through output which operates to pass the TV signal from expansion device 95 to, for example, a user's TV or VCR. Expansion device 95 also includes a video output which feeds either a composite video output signal or SVIDEO output signal and includes an input/output connection to the telephone system which is coupled to a modem within expansion device 95.

As shown in FIG. 1B, expansion device 95 includes an audio input which permits, for example, interconnection with a microphone. The microphone permits taking advantage of the DSVD capabilities of the expansion device modem. In this context, the modem mixes data coming from the video game console 52 and input audio information. The microphone may be used for voice input which may be digitized for use in a game. The audio input also permits the input of other audio information which may then be digitized and coupled to video game console 52 for use in a game. Alternatively, the input audio information may be directly coupled to an associated speaker. Expansion device 95 also includes an audio output that may be directly coupled to the user's TV and/or a headset.

Expansion device 95 also includes infrared IR control. Infrared input signal processing, for example, permits a TV tuner within expansion device 96 to be remotely controlled via the IR input signal. The IR controller may be linked to the TV tuner after IR information is processed in the video game console 52, or alternatively the information may be processed by an IR control CPU in expansion device 95. The IR output is used to control an associated cable box that may be coupled to the RF input described above. Thus the IR output may be used to change channels via an associated cable box. The IR output may, for example, be used to remotely control the TV power or to control recording in an associated VCR. The television power may be controlled, for example, by a user depressing the "Power" button on a hand-held IR remote. The IR signal is sent to the expansion device 95 IR input. The expansion device 95 sends this information to the video game console 52. The video game console 52 recognizes this as a "Power" button depression. It then commands the expansion device 95 to output the IR signal to the TV that commands the TV to toggle its power. The overall system is powered via a power input from game console 52.

In accordance with another exemplary embodiment, the IR output may control both a cable box and a VCR at the same time. For example, two IR LEDs may be placed on a single output. One IR LED could be placed next to the VCR, the other next to the cable box. The signal generated by the expansion device 95 causes both LEDs to flash at the same time with the same signal. The cable box sees transmissions intended for the VCR, and the VCR sees transmissions intended for the cable box, but since each device is programmed to respond only to its own unique set of signals, one device will ignore the signals intended for the other device. In this way, two devices may be controlled with the same signal output. Another device which may be controlled by the IR output is a Direct Broadcast Satellite box.

The system shown in FIG. 1B permits a user to receive enhanced television services. For example, a TV channel guide may be downloaded via the Internet, allowing a user to spot a desired program and to immediately tune to the program via the expansion device TV tuner and IR input. The IR signal may be coupled to the cable box, a Direct Broadcast Satellite Box, or a VCR. The TV channel guide may be captured from data transmitted in the vertical blanking interval of a television signal. In one exemplary embodiment, the signal from a remote controller is not directly linked to the IR transmitter. The video game console 52 first interprets the IR signal, then remaps the signal to the device to be controlled via the IR transmitter.

The system shown in FIG. 1B also permits a user to watch TV while simultaneously logging onto the Internet. This feature advantageously allows a user to observe his or her favorite news, sports or entertainment show while waiting for Internet access. Expansion device 95 permits the video game console 52 to be coupled to the Internet to play multiplayer games, or alternatively, to dial a friend and play a game involving head-to-head competition.

Expansion device 95 also provides video game console 52 with a mass storage device (such as a hard drive) to permit the downloading of entire games onto the mass storage device. The purpose of the mass storage device is not only for downloading entire games, but also for caching of internet data to permit user-friendly viewing of internet pages. It is also for storing downloaded upgrades of games, additional levels of games, and non-game data such as text files.

If the system is used with a game cartridge 54, game cartridge 54 may be programmed to utilize the expansion device modem and mass storage device. Alternatively, in one embodiment of the present invention, the system shown in FIG. 1B may be operated without a cartridge 54.

Figure 1C:
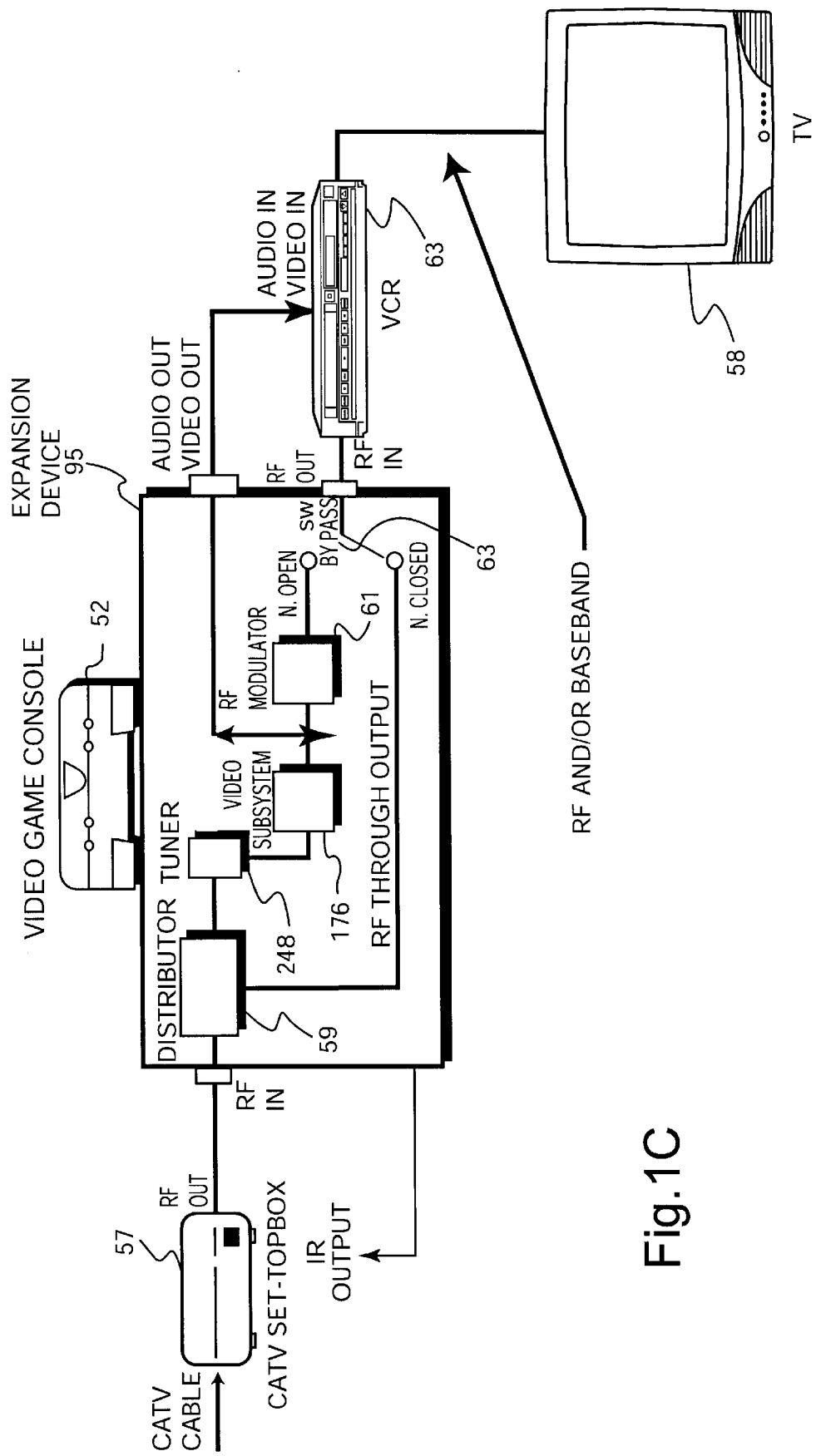
FIG. 1C is an illustrative component interconnection diagram showing an exemplary embodiment of the present invention in a home video game system context.

FIG. 1C is an illustrative component interconnection diagram showing an exemplary embodiment of the present invention in a home video game system context. As shown in FIG. 1C, a television signal is transmitted to a cable TV box 57, which outputs, for example, a broadband output signal that is coupled to the RF input of expansion device 95. The cable TV box 57 may alternatively be a Direct Satellite Broadcast box, or a broadcast TV antenna. Expansion device 95 is also coupled to video game system console 52 as shown in FIGS. 1A and 1B.

The input broadband TV signal is split by distributor 59 such that the RF signal is in one path input to tuner 248 and in another path is passed through to bypass switch 63. Tuner 248 provides a demodulated baseband signal, which is coupled to the video subsystem 176. The video subsystem output is modulated by RF modulator 61 to a broadband signal, and the broadband signal is coupled to bypass switch 63.

Bypass switch 63 is normally in a closed position to provide a bypass path for the input RF signal. Bypass switch 63 provides a bypass path during power down conditions or otherwise switches is response to a switching control signal. Bypass switch 63 is switched to the open position in response to a control signal (for example, received via the I²C bus described below in conjunction with FIG. 5A) under program control. Thus, when the system powers down, or in a default condition, an RF output is always coupled to the expansion device 95 output. Alternatively, the bypass switch 63 may be controlled to output signals generated by the video subsystem 176, such as, for example, a picture-in-picture display as will be described in detail below via the audio/video output of expansion device 95.

As shown in FIG. 1C, the baseband video subsystem 176 output and the RF output signal are coupled to respective inputs of the VCR 163. The RF and/or baseband outputs of VCR 63 are coupled to a user's home television 58. As described above in conjunction with FIG. 1B, expansion device 95 also outputs an IR output signal.

Prior to describing further details of expansion device 95, the video game system 50 will be described in conjunction with FIG. 2, which is a block diagram of an illustrative embodiment of console 52 coupled to a game cartridge 54. FIG. 2 shows a main processor 100, a coprocessor 200, and main memory 300 which may include an RDRAM expansion module 302. For a more complete description of the video game system shown in FIG. 2, including details of the peripheral interface 138 and other components, reference is made to the applicants' assignee's copending application Ser. No. 08/562,288, entitled "High Performance/Low Cost, Video Game System With Multifunctional Peripheral Processing Subsystem", which application is incorporated herein by reference in its entirety.

Main processor 100 is the computer that executes the video game program within storage device 54 in conjunction with coprocessor 200. In this example, the main processor 100 accesses this video game program through the coprocessor 200 over a communication path 102 between the main processor and the coprocessor 200, and over another communication path 104a,b between the coprocessor and the video game storage device 54. Alternatively, the main processor 100 can control the coprocessor 200 to copy the video game program from the video game storage device 54 into main memory 300 over path 106, and the main processor 100 can then access the video game program in main memory 300 via coprocessor 200 and paths 102, 106. Main processor 100 accepts inputs from game controllers 56 during the execution of the video game program.

Main processor 100 generates, from time to time, lists of instructions for the coprocessor 200 to perform. Coprocessor 200 may be any compatible coprocessor which supports rapid processing of 3D graphics and digital audio or it may be a special purpose high performance, application specific integrated circuit having an internal design that is optimized for rapidly processing 3D graphics and digital audio information. In response to instruction lists provided by main processor 100 over path 102, coprocessor 200 generates video and audio outputs for application to color television set 58 based on data stored within main memory 300 and/or video game storage device 54.

FIG. 2 also shows that the audio video outputs of coprocessor 200 are not provided directly to television set 58 in this example, but are instead further processed by external electronics outside of the coprocessor. In particular, in this example, coprocessor 200 outputs its audio and video information in digital form, but conventional home color television sets 58 require analog audio and video signals.

Therefore, the digital outputs of coprocessor 200 must be converted into analog form—a function performed for the audio information by DAC and mixer amp 40 and for the video information by VDAC and encoder 144. The analog audio signals generated in DAC 140 are amplified and filtered by an audio amplifier therein that may also mix audio signals generated externally of console 52 via the EXT-SOUND L/R signal from connector 154. The analog video signals generated in VDAC 144 are provided to a video encoder therein which may, for example, convert "RGB" inputs to composite video outputs compatible with commercial TV sets. The amplified stereo audio output of the amplifier in ADAC and mixer amp 140 and the composite video output of video DAC and encoder 144 are provided to directly control home color television set 58. The composite synchronization signal generated by the video digital to analog converter in component 144 is coupled to its video encoder and to external connector 154 for use, for example, by an optional light pen or photogun.

FIG. 2 also shows a clock generator 136 that produces timing signals to time and synchronize the other console 52 components. Different console components require different clocking frequencies, and clock generator 136 provides suitable such clock frequency outputs (or frequencies from which suitable clock frequencies can be derived such as by dividing).

In this illustrative embodiment, game controllers 56 are not connected directly to main processor 100, but instead are connected to console 52 through serial peripheral interface 138. Serial peripheral interface 138 demultiplexes serial data signals incoming from up to four or five game controllers 56 (e.g., 4 controllers from serial I/O bus 151 and 1 controller from connector 154) and provides this data in a predetermined format to main processor 100 via coprocessor 200. Serial peripheral interface 138 is bidirectional, i.e., it is capable of transmitting serial information specified by main processor 100 out of front panel connectors 80a–d in addition to receiving serial information from those front panel connectors. The serial interface 138 receives main memory RDRAM data, clock signals, commands and sends data/responses via a coprocessor serial interface (not shown). I/O commands are transmitted to the serial interface 138 for execution by its internal processor as is described in copending application Ser. No. 08/562,288. In this fashion, the peripheral interface's processor by handling I/O tasks, reduces the processing burden on main processor 100. As is described in more detail in application Ser. No. 08/562,288, serial peripheral interface 138 also includes a "boot ROM (read only memory)" that stores a small amount of initial program load (IPL) code. This IPL code stored within the peripheral interface boot ROM is executed by main processor 100 at time of startup and/or reset to allow the main processor to begin executing game program instructions 108 within storage device 54. The initial game program instructions 108 may, in turn, control main processor 100 to initialize the drivers and controllers it needs to access main memory 300.

In this exemplary embodiment when operating in the cartridge game play mode, serial peripheral interface 138 includes a processor (not shown) which, in addition to performing the I/O tasks referred to above, also communicates with an associated security processor 152 within storage device 54 and performs security tasks. This pair of security processors (one in the storage device 54, the other in the console 52) performs, in cooperation with main processor 100, an authentication function to ensure that only authorized storage devices may be used with video game console 52.

As shown in FIG. 2, peripheral interface 138 receives a power-on reset signal from reset IC 139. Reset IC 139 detects an appropriate threshold voltage level and thereafter generates a power-on reset signal which, in turn, results in a cold reset signal being generated, which signal is coupled to the reset input of main processor 100.

FIG. 2 also shows a connector 154 within video game console 52. In this illustrative embodiment, connector 154 connects, in use, to the electrical contacts 74 at the edge 72 of storage device printed circuit board 70. Thus, connector 154 electrically connects coprocessor 200 to storage device ROM 76. Additionally, connector 154 connects the storage device security processor 152 to main unit serial peripheral interface 138. Although connector 154 in the particular example shown in FIG. 2 may be used primarily to read data and instructions from a non-writable read only memory 76, system 52 is designed so that the connector is bidirectional, i.e., the main unit can send information to the storage device 54 for storage in random access memory 77 in addition to reading information from it.

Main memory 300 stores the video game program in the form of CPU instructions 108. All accesses to main memory 300 are through coprocessor 200 over path 106. These CPU instructions are typically copied from the game program/data 108 stored in storage device 54 and downloaded to RDRAM 300. This architecture is likewise readily adaptable for use with CD ROM or other bulk media devices. Although CPU 100 is capable of executing instructions directly out of storage device ROM 76, the amount of time required to access each instruction from the ROM is much greater than the time required to access instructions from main memory 300. Therefore, main processor 100 typically copies the game program/data 108 from ROM 76 into main memory 300 on an as-needed basis in blocks, and accesses the main memory 300 in order to actually execute the instructions. Memory RD RAM 300 is preferably a fast access dynamic RAM capable of achieving 500 Mbytes/second access times such as the DRAM sold by RAMBUS, Inc. The memory 300 is coupled to coprocessor 200 via a unified nine bit wide bus 106, the control of which is arbitrated by coprocessor 200. The memory 300 is expandable by merely plugging, for example, an 8 Mbyte memory card into console 52 via a console memory expansion port (not shown).

The main processor 100 preferably includes an internal cache memory (not shown) used to further decrease instruction access time. Storage device 54 also stores a database of graphics and sound data 112 needed to provide the graphics and sound of the particular video game. Main processor 100, in general, reads the graphics and sound data 112 from storage device 54 on an as-needed basis and stores it into main memory 300 in the form of texture data, sound data and graphics data. In this example, coprocessor 200 includes a display processor having an internal texture memory into which texture data is copied on an as-needed basis for use by the display processor.

Storage device 54 also stores coprocessor microcode 156. In this example, a signal processor within coprocessor 200 executes a computer program in order to perform its various graphics and audio functions. This computer program, called the "microcode," is provided by storage device 54. Typically, main processor 100 copies the microcode 156 into main memory 300 at the time of system startup, and then controls the signal processor to copy parts of the microcode on an as-needed basis into an instruction memory within signal processor for execution. Because the microcode 156 is provided by storage device 54, different storage devices can provide different microcodes—thereby tailoring the particular functions provided by coprocessor 200 under software control. Because the microcode 156 is typically too large to fit into the signal processor's internal instruction memory all at once, different microcode pages or portions may need to be loaded from main memory 300 into the signal processor's instruction memory as needed. For example, one part of the microcode 156 may be loaded into signal processor 400 for graphics processing, and another part of microcode may be loaded for audio processing.

Although not shown in FIG. 2, coprocessor 200 also includes a CPU interface, a serial interface, a parallel peripheral interface, an audio interface, a video interface, a main memory DRAM controller/interface, a main internal bus and timing control circuitry. The coprocessor main bus allows each of the various main components within coprocessor 200 to communicate with one another. The CPU interface is the gateway between main processor 100 and coprocessor 200. Main processor 100 reads data to and writes data from coprocessor CPU interface via a CPU-to-coprocessor bus. A coprocessor serial interface provides an interface between the serial peripheral interface 138 and coprocessor 200, while coprocessor parallel peripheral interface 206 interfaces with the storage device 54 or other parallel devices connected to connector 154.

A coprocessor audio interface reads information from an audio buffer within main memory 300 and outputs it to audio DAC 140. Similarly, a coprocessor video interface reads information from an RDRAM frame buffer and then outputs it to video DAC 144. A coprocessor DRAM controller/interface is the gateway through which coprocessor 200 accesses main memory 300. The coprocessor timing circuitry receives clocking signals from clock generator 136 and distributes them (after appropriate dividing as necessary) to various other circuits within coprocessor 200.

Main processor 100 in this example is a MIPS R4300 RISC microprocessor designed by MIPS Technologies, Inc., Mountain View, Calif. For more information on main processor 100, see, for example, Heinrich, MIPS Microprocessor R4000 User's Manual (MIPS Technologies, Inc., 1984, Second Ed.). The conventional R4300 main processor 100 supports six hardware interrupts, one internal (timer) interrupt, two software interrupts, and one non-maskable interrupt (NMI). In this example, three of the six hardware interrupt inputs (INT0, INT1 and INT2) and the non-maskable interrupt (NMI) input allow other portions of system 50 to interrupt the main processor. Specifically, main processor INT0 is connected to allow coprocessor 200 to interrupt the main processor, the main processor interrupt INT1 is connected to allow storage device 54 or other external devices to interrupt the main processor, and main processor interrupts INT2 and NMI are connected to allow the serial peripheral interface 138 to interrupt the main processor. Any time the processor is interrupted, it looks at an internal interrupt register to determine the cause of the interrupt and then may respond in an appropriate manner (e.g., to read a status register or perform other appropriate action). All but the NMI interrupt input from serial peripheral interface 138 are maskable (i.e., the main processor 100 can selectively enable and disable them under software control).

Figure 3:
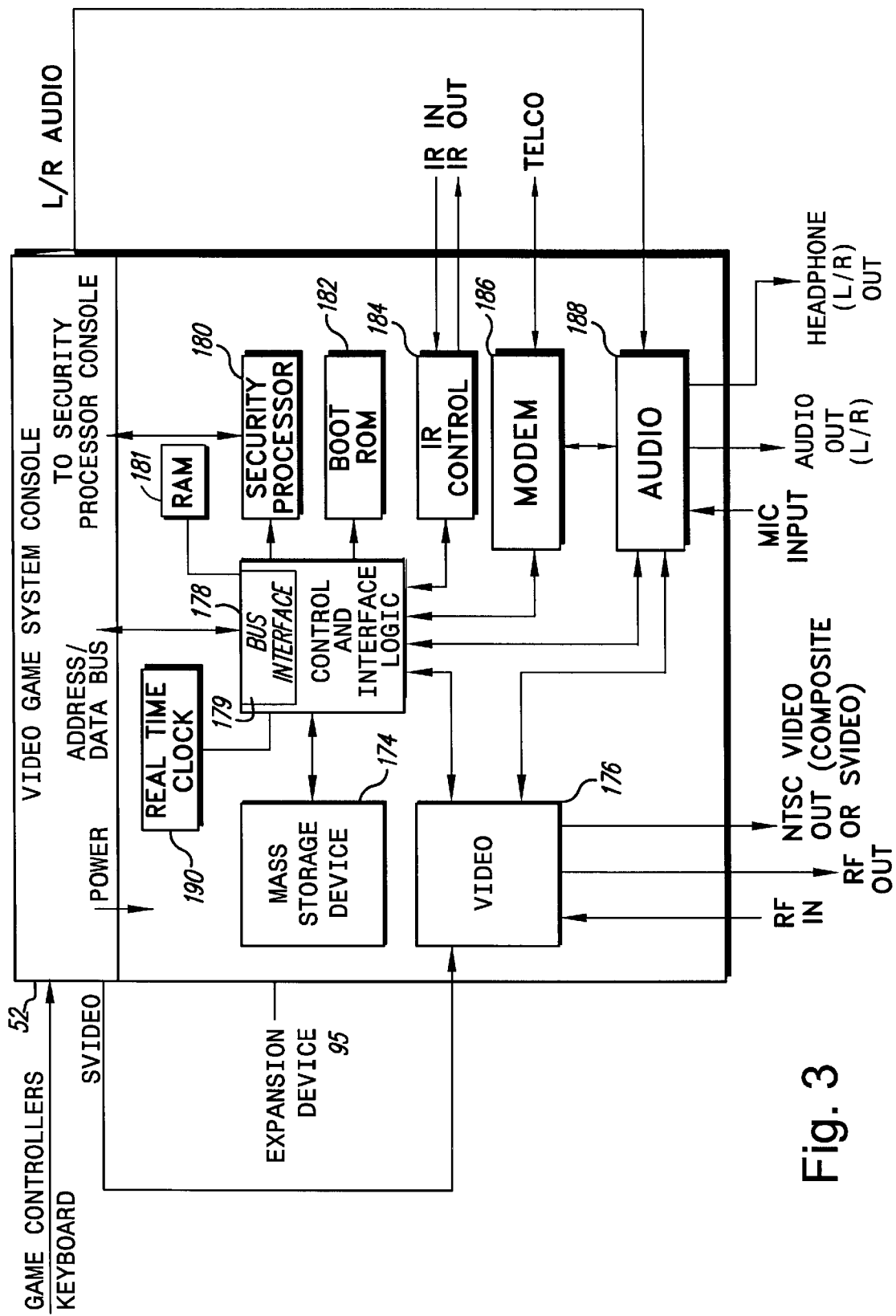
FIG. 3 is a block diagram of the system shown in FIGS. 1A and 1B showing the expansion device in further detail.

FIG. 3 is a block diagram similar to FIG. 1B but shows the expansion device 95 in further detail. Data and control signals are coupled from video game console 52's address and data (address/data) bus to the expansion device 95 and from expansion device 95 to video game console 52 via control interface logic 178. Thus, each of the internal integrated circuits in the expansion device 95 are controlled by the main processor (CPU) 100 in the console 52 through the control interface logic component 178.

FIG. 3 shows a keyboard and game controllers connected to the video game console 52. In accordance with one embodiment of the present invention, the wired keyboard connection may be replaced by, for example, an infrared wireless keyboard link. The keyboard data may be input via the RF input to video circuitry 176.

Control and interface logic 178, which may be implemented in a variety of different ways, includes the control and video game system interface logic for expansion device components including mass storage device 174, video circuitry 176, modem 186, and audio circuitry 188. In accordance with an exemplary embodiment of the present invention, control and interface logic 178 includes a bus interface 179 for controlling communication over the address/data bus of the video game system shown in FIG. 3. Bus interface 179 receives direct memory access (DMA) read/write commands over the video game system console's address/data bus and responds to such commands by supplying the requested data or by transferring data to an identified component. Thus, large data blocks may be transferred by control and interface logic 178 in DMA mode to, for example, mass storage device 174. The control and interface logic 178 receives a DMA request with appropriate addresses and transfers data between the video game console and expansion device 95 in response to read or write clock signals. Data is typically obtained by control and interface logic 178 from RAM 181, boot ROM 182, mass storage device 174 and transferred to the video game console main memory RD RAM 300 (FIG. 2).

The expansion device 95 also includes an audio section 188 controlled by control and interface logic 178. The audio circuitry 188 receives and may, for example, be utilized to mix the left and right audio received from video game console 52 with the audio output of the tuner resident in the video section 176. The audio section 188 receives audio information from a microphone input, digitizes such audio input and, for example, may couple such audio information to the video game system console 52. Audio section 188 includes an audio output (L/R) and a headphone audio output (L/R).

Expansion device 95 also includes a modem 186 which is controlled by control and interface logic 178. Data and control signals may be coupled to and from modem 186 and, for example, video game console 52 via control and interface logic 178. Modem 186 is coupled to audio section 188 to permit voice data to be input and output to the modem. As is conventional, modem 186 interfaces with the telephone line for receiving and transmitting information. Modem 186 may, for example, be any of a wide range of modems such as a V.34 or V.90 telephone modem, an ADSL modem, a cable modem, or, wireless modem.

Control and Interface logic 178 may additionally include a digital signal processor (DSP) and an associated first in, first out (FIFO) stack for use in controlling modem 186. Modem 186 requires hand-shaking operations for data exchange which is controlled by the digital signal processor. The FIFO buffers data communicated to and from modem 186. The modem DSP interrupts the video game console 52 via the console's control and status registers to inform the video game console 52 that modem data is ready for processing.

Control and interface logic 178 is also coupled to RAM 181. RAM 181 provides buffer space for incoming modem data and disk sectors, for example, from mass storage device 174 during read/write operations.

Mass storage device 174 is preferably a fixed hard disk drive, but may, for example, be a removable hard disk drive. The storage device 174 may alternatively be some other high-capacity media such as Digital Versatile Disc (DVD) RAM. Alternatively, mass storage device may be implemented by a high capacity floppy disk or high capacity flash memory module. Mass storage device 174 stores a network browser program, the expansion device operating system, and all expansion device application programs. Mass storage device 174 also stores information downloaded to expansion device 95 from the Internet, such as, for example, video games and other application programs. Mass storage device 174 is controlled by an associated disk controller in control and interface logic 178 which receives control signals from the video game console 52 address/data bus.

Both the disk controller and modem controller, for example, have access to the same video game system 52 RAM/ROM space to form a unified memory structure. In an exemplary embodiment, both controllers share the memory resources and transfer memory between each other and transfer data to the video game system host. The memory subsystem requires a minimum bandwidth that is high enough to support concurrent access for all systems that have memory access. This combined architecture allows for flexible buffer schemes such as FIFOs and LIFOs. As indicated above, data may be downloaded directly to disk 174 without any host CPU action through DMA operation. Tasks may also be distributed across different processors using the unified memory scheme shown in FIG. 2. To permit the disk controller and modem controller to have concurrent access to RDRAM 300, a time multiplexed access scheme may be utilized. For example, each of the controllers may be assigned a time slice for reading from and writing to RDRAM 300. The memory speed needs to be sufficiently high enough so that concurrent access for all systems requiring memory access may be accomplished.

Control and interface logic 178 receives and couples control information from the console 52 address/data bus to video circuitry 176 such as, for example, size information for picture-in-picture displays, overlay information, and information for changing the expansion device tuner channel. The video section 176 transfers video information to, for example, video game system console 52 via the control interface and logic section 178. In this fashion, an image may be captured from the video RF input and forwarded to the video game console via the address/data bus. Intercast data carried in the vertical and/or horizontal blanking intervals may bidirectionally flow between the control interface logic 178 and video game system console 52 for a variety of purposes. In accordance with one exemplary embodiment, antipiracy features may be built into the system by monitoring the vertical blanking interval data received via the video signal and reinserting data at the output of the signal designed to prevent pirating.

Intercast data in the form of HTML information may be fed to the video game system console which forwards such information to an associated browser stored in mass storage device 174. Alternatively, program TV guide information may be fed to the video game system console. In this fashion, TV guide information received over the Internet may in turn be stored in mass storage device 174 as the current TV guide. If a TV guide application program is resident in mass storage device 174, the current TV guide information will be utilizable by the user to, for example, identify and tune to a desired television program.

Expansion device 95 additionally includes infrared control circuitry 184 for receiving infrared input and coupling such infrared input to control and interface logic 178, which, in turn, couples such information to video game system console 52 or to video circuitry 176 for changing the TV channel via the tuner embodied in the video section 176 or via an IR transmitter. Thus, channel changing may occur under the control of control and interface logic 178 and the video section 176 tuner, even if the video game system console is in the process of controlling game play. Alternatively, the remote infrared control input may be utilized to change the TV channel under the control of the video game system console. During game play, a channel may be changed, for example, in picture-in-picture mode under the control of the expansion device's control and interface logic 178 and the video section's tuner. The infrared output is utilized, for example, to control via video game console 52's processor, channel changing of an external device, such as a cable box or VCR.

Boot ROM 182 is utilized during system startup and stores information for generating initial screen and other initialization data. Boot ROM 182 may also include system diagnostic software to, for example, ensure that mass storage device 174 is operational on startup. Boot ROM 182 will initiate processing from the program that is stored in a prescribed address of ROM 76 in the game cartridge 54 when the game cartridge 54 is attached to the console 52; and it will initiate processing from the program that is stored at a prescribed address of the hard disk 174 when the game cartridge 54 is not attached to the console 52. In accordance with an exemplary embodiment, when the game cartridge 54 is attached, the game cartridge 54 is given priority. Thus, by using a boot-strap ROM that stores the startup program, the system can be started by giving the program in the cartridge priority, and thereby starting the program in accordance with the program stored in the cartridge ROM when a cartridge is attached to the video game device; and in accordance with a program stored in the hard disk when no cartridge is attached.

Expansion device 95 also includes a security processor 180. Exemplary security operations performed in accordance with an illustrative embodiment of the present invention are described further below. As indicated above, serial peripheral interface 138 in FIG. 2 includes a processor which performs security tasks and which communicates with security processor 180. This pair of security processors each perform an authentication/security check. If the authentication/security check is not successful, the system is held in a reset state.

Expansion device 95 also includes a real time clock 190. The real time clock is used to maintain time and date information, which may, for example, be used during security processing.

Figure 4:
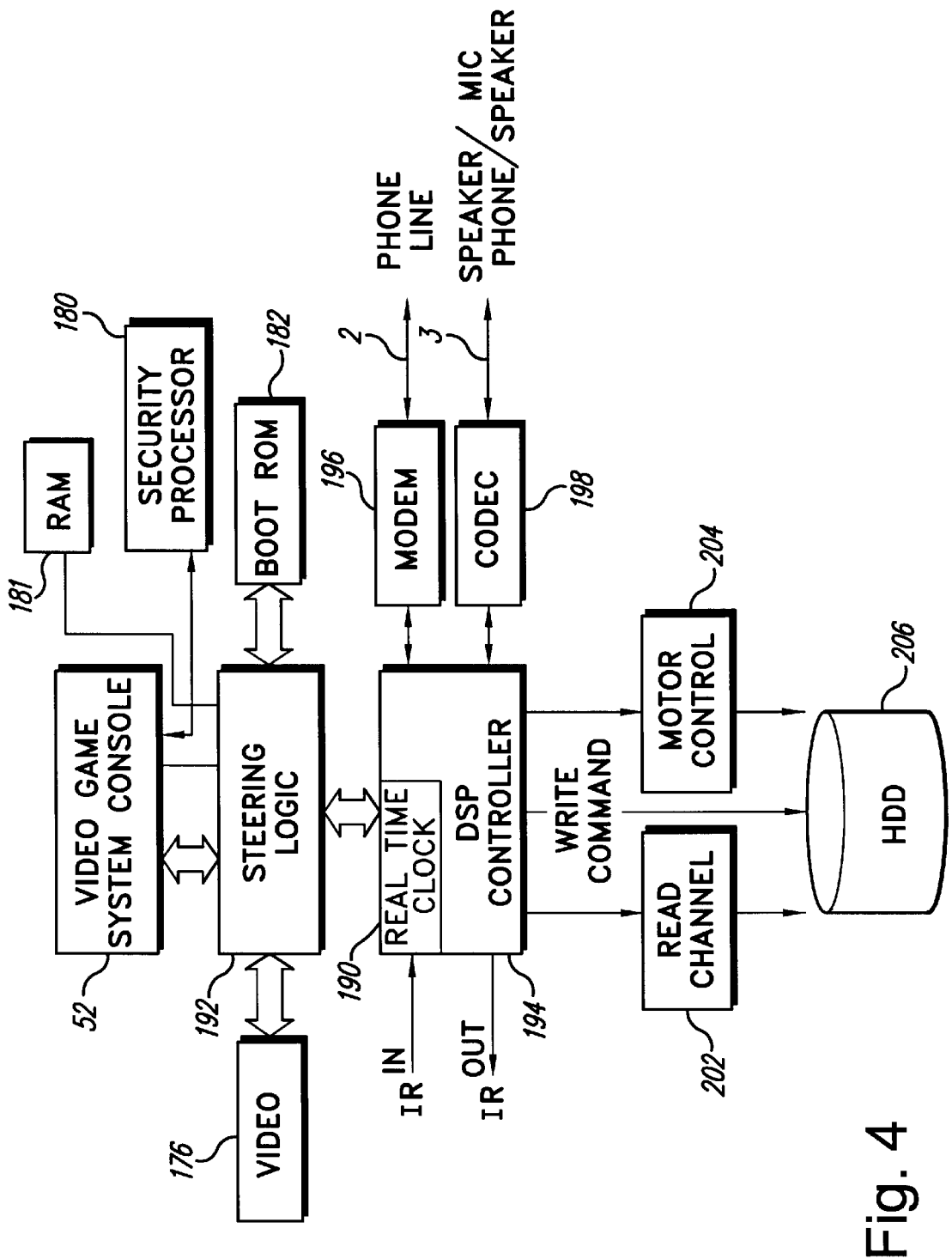
FIG. 4 is a more detailed block diagram of the expansion device shown in FIG. 3 depicting a preferred integrated modem and mass storage device control.

FIG. 4 is a further block diagram of an exemplary expansion device 95 embodiment depicting shared integrated control for the modem and mass storage device. As represented in FIG. 4, the digital signal processor (DSP) based controller 194 utilized to control hard drive 206 is also utilized to control modem 196. Modem 196, which is utilized to interface with the phone lines, codec 198, which interfaces with the speaker phone and microphone I/O lines, read channel control 202, motor control 204 and the write command input associated with hard drive 206 are each coupled to DSP controller 194. The DSP controller 194 includes a real time clock 190 as well as input and output for infrared control.

DSP controller 194 communicates with the video section 176 and the video game console 52 via steering logic 192.

Steering logic 192 may, for example, receive address information designating the appropriate destination for transmitted information. Steering logic 192 is also coupled to boot ROM 182 shown and previously described in conjunction with FIG. 3. Security processor 180 is coupled directly to video game console 52.

The control system represented in FIG. 4 advantageously utilizes the mass storage device DSP controller to multitask to control both modem 196 and hard drive 206.

Figure 5A:
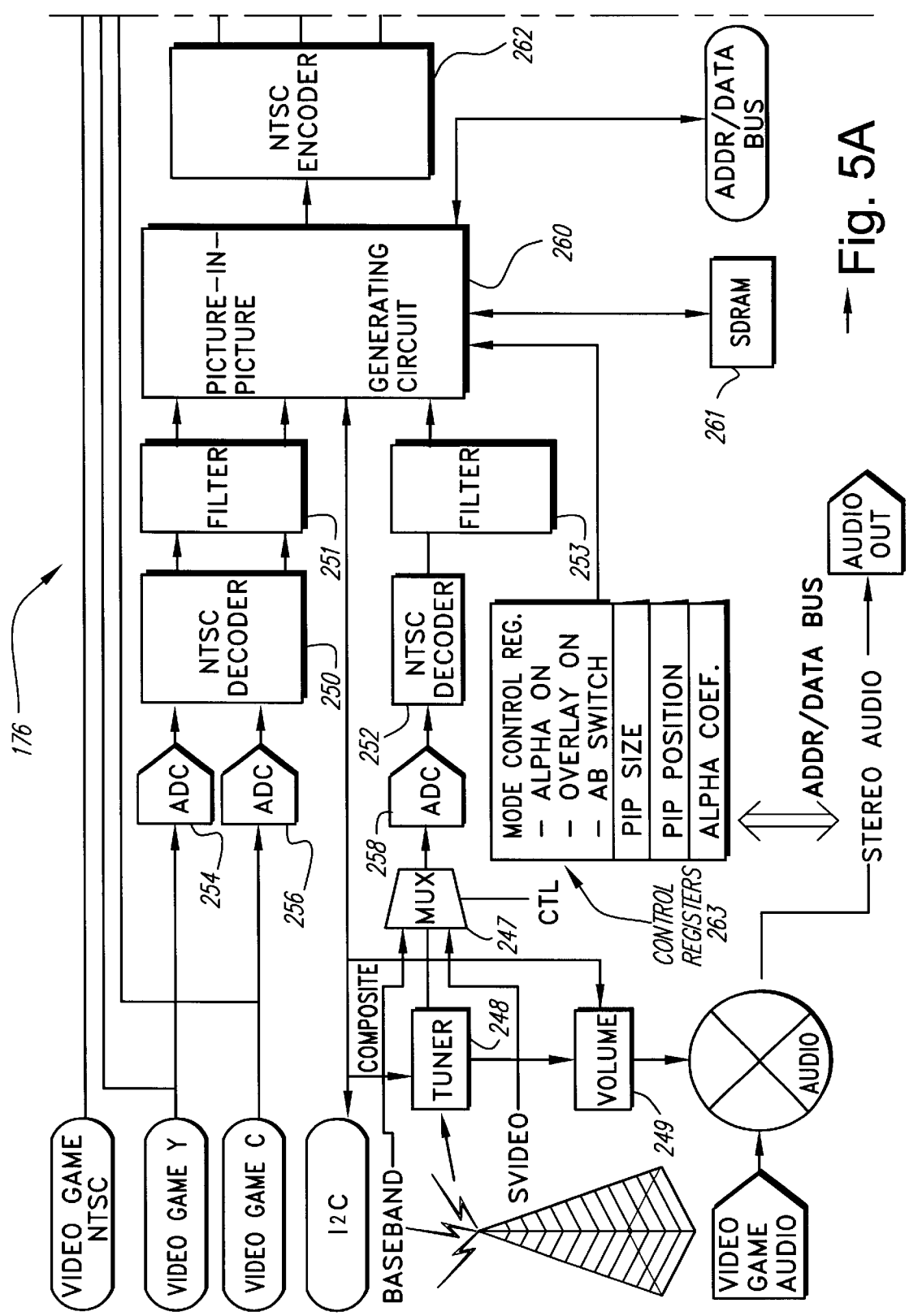
FIGS. 5A and 5B are a block diagram of the video circuit shown in FIGS. 3 and 4.
Figure 5B:
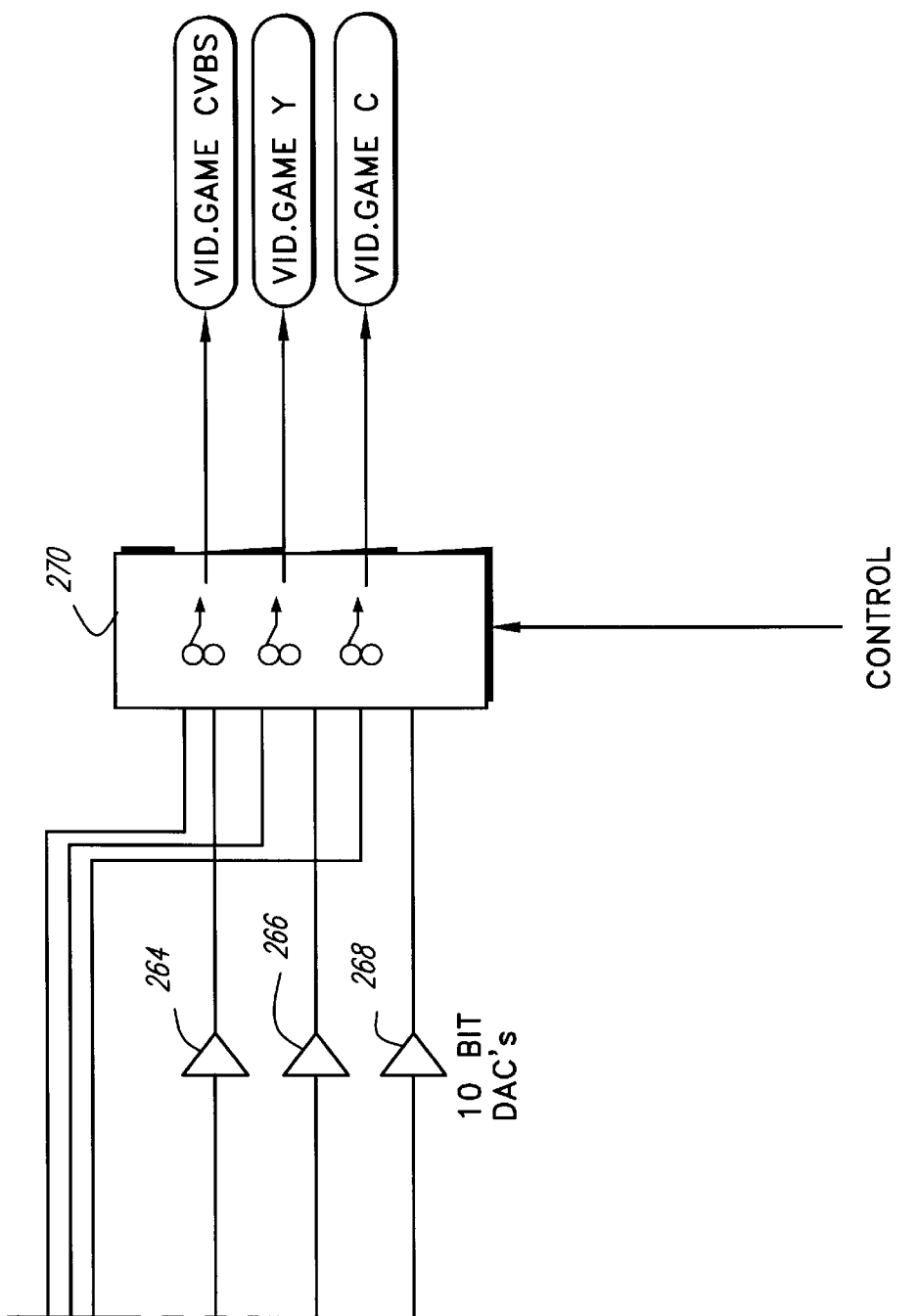

FIGS. 5A and 5B are a block diagram of video circuit 176 shown in FIGS. 3 and 4. Video module 176 includes control circuitry for generating a picture-in-picture display of the type commercially available in many high-end television sets. Additionally, video circuit 176 operates to generate overlays of one picture upon another, and alpha blending involving translucent overlays with the associated ability of scaling an image to a desired size. Video circuit 176 determines which image parts may be mixed and which are not to be mixed.

The video components are, for example, coupled via an $I^2C$ bus, which is a conventional serial bus designed for short distance communication. It provides a simple four wire, 400K bits per second interface for external expansion. The external expansion may be accomplished with an $I^2C$ port which may include printers, keyboards, mice, etc. and which may be used to control external video devices, such as tuners and picture-in-picture devices.

As shown in FIG. 5A, video circuitry 176 receives a complete NTSC signal and the SVIDEO signal output from video game system console 52 (FIG. 3). The SVIDEO signal is input via the Video Game Y and Video Game C inputs. Additionally, as shown in FIG. 5A, a broadcast TV signal is received and coupled to the video circuit's tuner 248, which outputs a baseband signal. Tuner 248 is preferably a 120 channel cable ready tuner having high signal quality. A baseband video signal also may be received by video circuit 176 and coupled to an input pin via the video game system 50 or, for example, from the output of a VCR (not shown), Direct Satellite box or a cable box. The baseband signal, an SVIDEO input signal and the output of tuner 248 are coupled to the inputs of multiplexer 249. Upon receipt of a control signal from, for example, control registers 263, one of these three multiplexer input signals is coupled to analog to digital converter 258, whose output is coupled to NTSC decoder 252.

As shown in FIG. 5A, the received signals are coupled to, for example, 8 bit analog to digital (ADC) converters 254, 256 and 258, whose outputs are in turn coupled to conventional NTSC decoders 250 and 252. The output of NTSC decoders 250 and 252 are coupled to noise processing filters 251 and 253, respectively. The output of filter 251, filter 253 and the signal received via input pin $I^2C$ are coupled to a picture-in-picture generating circuit 260 which is described further below in conjunction with FIGS. 6A and 6B.

In accordance with one exemplary embodiment of the present invention, control of the video circuitry 176 may be accomplished by control signals transmitted via the $I^2C$ input. For example, such control signals may be utilized under control of the video game console processor to set up the control registers 263, to obtain status information about the video circuitry 176, and to transfer frame buffer vertical blanking interval data to the video circuitry 176. Alternatively, such control functions may be controlled in response to signals transmitted over the video game system address/data bus. The $I^2C$ pin may be utilized to, for example, query tuner 248, to determine whether there is a signal on a particular channel that has been set (to indicate whether the desired channel has been locked on). The $I^2C$ input may be used to control tuner 248, volume control 249, and modulator 61 and bypass switch 63 shown in FIG. 1C.

Picture-in-picture generating circuit 260 may operate in various programmable modes. For example, it may capture an input picture image and store it in SDRAM 261. Alternatively, in accordance with an exemplary embodiment, picture-in-picture generating circuit may digitally "mix" two of its inputs together as instructed based upon the output of control registers 263. Picture-in-picture generating circuit preferably operates to perform picture composing operations to generate a composite picture by partially overwriting picture image data from one source with composite picture data from another source. Such image mixing typically utilizes SDRAM 261 in that a received signal is mixed with a previously received and stored signal resident in SDRAM 261 for time-base correction purposes.

In mixing operations where one image is overlayed on another, chroma key processing may be utilized. In chroma key image processing, an image is generated by, for example, the video game system 50 having a background of a predetermined key color. A second image is generated and the two are mixed together in an overlay display as is explained further in detail below.

Instead of an overlaying operation, an alpha blending operation may be controlled by setting a particular bit in the mode control register shown as one of the control registers 263. Such a blending operation may, for example, be used to generate a display where the channel number or information about a particular show is generated at the bottom portion of the television screen.

In picture-in-picture processing, an image is extracted from SD RAM 261. The display of the extracted image is preferably programmable as to its size and display position on the display screen. As indicated in FIG. 5A, the picture-in-picture generating circuit 260 is accessible via the video game system address/data bus (Addr/Data Bus) as are the control registers 263, wherein picture-in-picture size and origin location position data is stored.

An NTSC encoder 262 receives an image bit map from picture-in-picture generating circuit 260 and adds the appropriate horizontal and vertical synchronization signals required for television display. As shown in FIG. 5B, the output of NTSC encoder 262 is coupled to an analog video switch 270 via digital to analog converters 264, 266, and 268.

As shown in FIGS. 5A and 5B, additional video game inputs are directly coupled to analog video switch 270 to provide an optimal high quality path for video game play. By virtue of the separate paths shown in FIGS. 5A and 5B to the analog video switch, either the raw untouched video game system data is coupled to the user's TV or the appropriately mixed, processed data is coupled to the TV. Based upon the current processing mode as indicated by its control input, analog video switch 270 chooses between the raw video game data inputs or the processed video inputs to couple to the TV.

Video circuit 176 also includes control registers 263 including a mode control register having control bits, the state of which triggers the picture-in-picture generating circuit and the analog video switch to enter a selected mode. For example, one or more mode control bits (AB switch) controls the state of analog video switch 270. Further bits control whether the overlay, alpha blending, or picture-in-picture mode is on.

Another of control registers 263 stores an alpha coefficient for controlling, for example, the extent to which a video image comes from the video game system versus from a tuner source. One or more other of control registers 263 store picture-in-picture size and position information. As will be understood by those skilled in the art, still other control registers may be used to control any of a number of other conventional functions not described above. As shown in FIG. 5A, control registers 263 are accessible to the video game system via the video game system's address and data bus (Addr/Data Bus).

In accordance with an exemplary embodiment, the picture-within a picture generating circuit 260 determines which screens of either the video game, broadcast television, or video recorder are selected, and it determines the screen size and at what coordinate position the selected screens will be displayed based on control data from the CPU 100 which is temporarily stored in control registers 263. The picture-in-picture generating circuit 260 generates the picture image data so as to display the various screens indicated by the control data onto the designated coordinate position and having the designated size. Thus, the picture-in-picture generating circuit 260 selects, for example, any one or two or more of the signals from among the game signal from a video game, a broadcast television signal from an antenna (or, for example, from Direct Broadcast Satellite or cable), and the picture image signal from a video recorder. After making such selections, circuit 260 may, for example, write the picture image data to a partitioned storage area that corresponds to each signal type (e.g., game, TV, video-tape recorder, Internet, etc.) in SD-RAM 261; where the maximum size of picture image data (e.g., the background picture image being assigned the lowest order of priority) is written to one frame portion of the display memory based on size data and priority data, and where the picture image data of the picture image having a smaller size and being assigned a higher priority order is written (over written) to the display memory storage area of the position that corresponds to the coordinates where it should be displayed by appropriately compressing the picture image so that it becomes a picture image data of the desired size. Thus, information from two or more video game portions of SD-RAM memory 261, TV, portion of SD-RAM 261, and video tape recorder portion 261 are written to a frame buffer portion of SD-RAM 261. In such a manner, by reading the display data that is stored in the display memory area of the SD-RAM 261, into the display line generator search of the television image receiver, the display of two or more screens of a picture-within a picture from among a game screen, a television screen, and a video screen may be realized. The software for controlling the picture-in-picture processing may be stored in, for example, boot ROM 182.

Figure 6A:
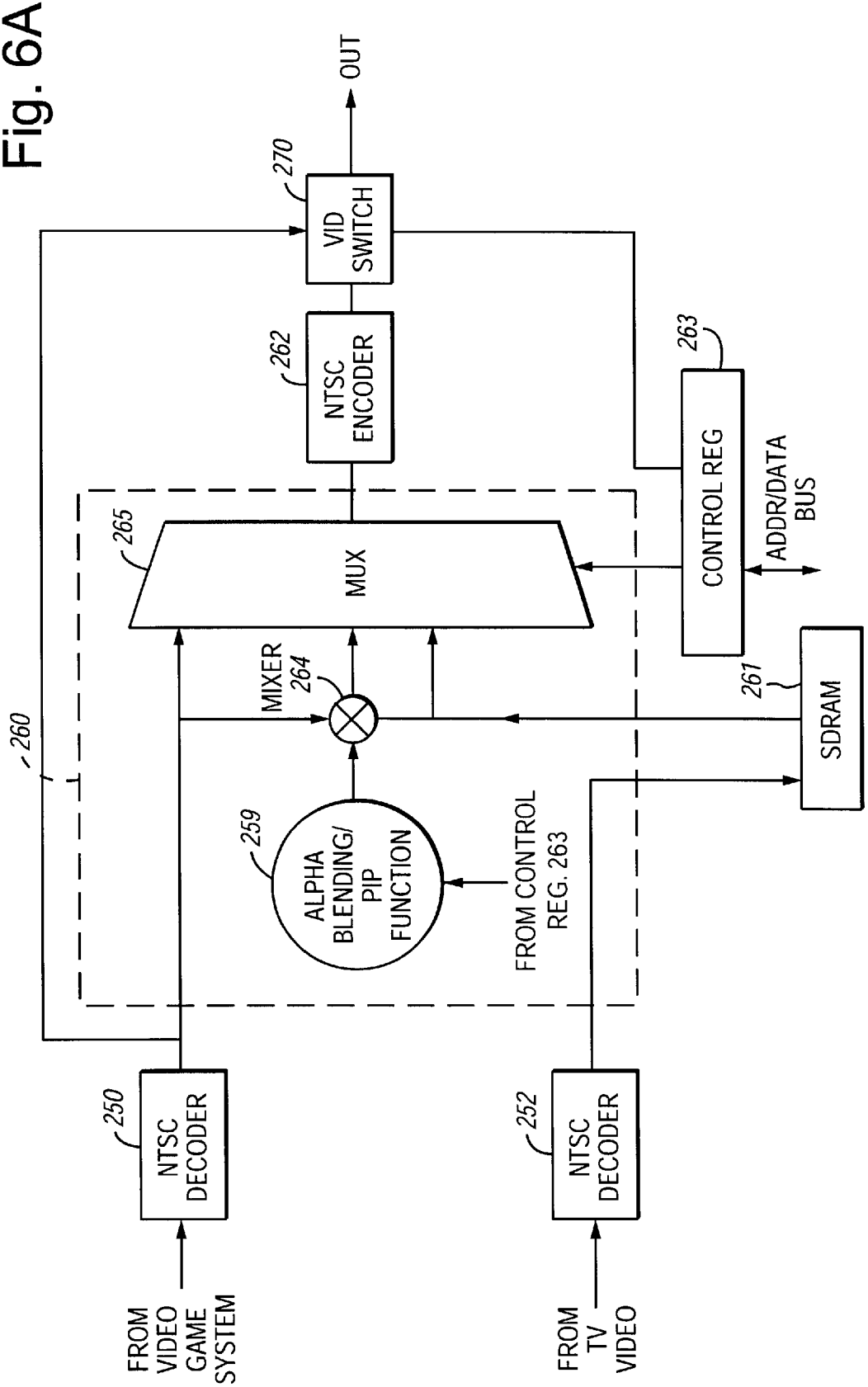
FIG. 6A is a block diagram depicting an exemplary picture-in-picture generating circuit in further detail in conjunction with other components shown in FIG. 5A and FIG. 5B.

FIG. 6A is a block diagram showing one exemplary embodiment of the picture-in-picture generating circuit 260 in further detail. As described in conjunction with FIG. 5A, signals from a TV video source are input to NTSC decoder 252 and then stored in SDRAM 261. The video game system video signal is coupled to NTSC decoder 250 and also directly coupled to video switch 270. Image data is then accessed from SDRAM 261 and either mixed via mixer 264 with other image data generated by alpha blending and picture-in-picture graphics generating circuitry 259 or is directly input to multiplexer 265. The alpha blending, picture-in-picture, and overlay generating circuitry 259, in accordance with one exemplary embodiment, may be of conventional design. The graphics circuitry 259 is responsive to the contents of the mode control register to determine whether, for example, an alpha blending operation is to be performed. If so, an alpha coefficient for controlling the extent to which a video image is to come from a particular source is provided from control registers 263. If operation is to take in a picture-in-picture processing mode, the graphics circuitry 259 will receive, for example, a control signal indicative of picture-in-picture mode and picture-in-picture size and position information. As shown in FIG. 5A, additional inputs may be coupled to multiplexer 265.

A selected one of the inputs to multiplexer 265 is coupled to the multiplexer output under the control of the contents of mode control register resident within registers 263, which as described above defines the desired mode of operation, i.e., alpha blending mode, overlay mode, picture-in-picture mode. Operation may also proceed in a chroma key mode. If operation is in chroma key mode, a key color will be searched for, and, if detected, a TV based image is, for example, selected for display. If the key color is not detected, a video game system image is selected. As previously explained, once the multiplexer input has been selected for output, it is then coupled to NTSC encoder 262 and then is output via video switch 270 whose switching state is controlled via the contents of mode control register 263.

Figure 6B:
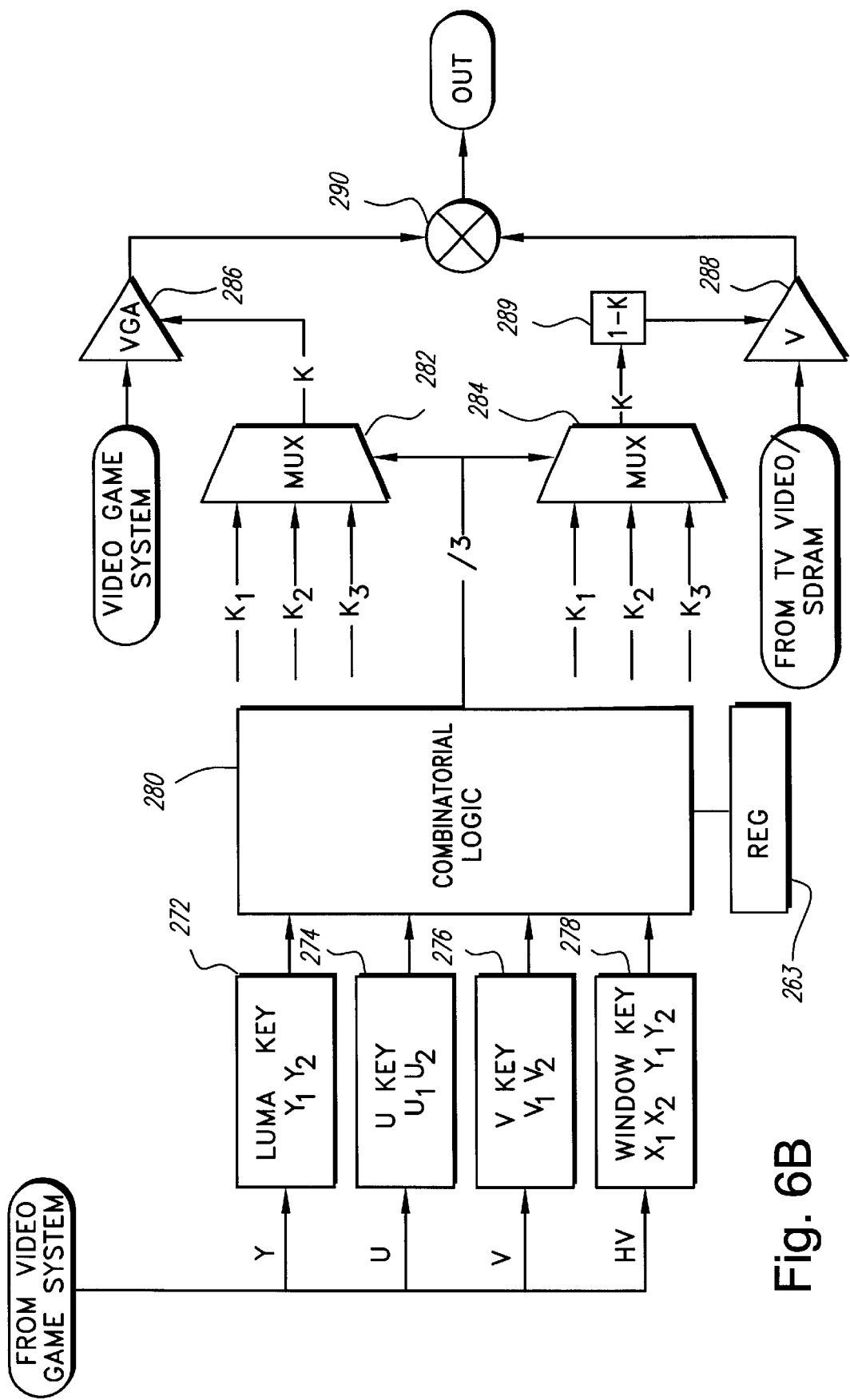
FIG. 6B shows an exemplary implementation of picture-in-picture generating circuit 260 shown in FIG. 6A.

FIG. 6B shows an exemplary embodiment of the picture-in-picture generating circuit and chroma key processing circuit 260 shown in FIG. 6A. The TV video signal output from NTSC decoder 252 which is input to SDRAM 261 as shown in FIG. 6A is represented in FIG. 6B as the image data which is input to FIG. 6B's variable gain amplifier VGA 288. The video game system output signal from NTSC decoder 250 shown in FIG. 6A is input at the "From Video Game System" input of FIG. 6B.

As represented in FIG. 6B, the digitized video game signal components are separated into luminance Y, chrominance U, saturation V, and horizontal and vertical pixel clock timing. These digitized signals are loaded into respective luminance, chrominance, saturation and horizontal and vertical pixel clock processing sections 272, 274, 276, and 278. Luma key section 272 includes two registers storing two luminance values, $Y_1$ and $Y_2$. The $Y_1$ and $Y_2$ luminance values are loaded in accordance with the video game program and represent the minimum and maximum luminance values for the luminance key to fire. More specifically, if the real time luminance value for Y falls within the defined minimum and maximum luminance values, then the luma key is indicated as being logically positive. This condition indicates that the selected brightness or luminance coming out of the video game signal is intended to be chroma keyed with a different signal as explained above. In the same manner, the chrominance U key section 274 and the saturation V key section 276 are respectively loaded with values $U_1$, $U_2$, and $V_1$, $V_2$, representing the maximum and minimum values for chrominance and saturation with the same chroma keying effect as explained above with regard to luminance.

Window key section 278 includes registers storing horizontal pixel clock values $X_1$, $X_2$ and vertical pixel clock values Y1, Y2 representing a rectangular area defining the size and position of the picture-in-picture display. If the real time horizontal and vertical pixel clocks values fall within the rectangular region defined in the window key registers 278, then a positive condition is indicated for the window chroma key. Thus, four separate conditions are utilized in FIG. 6B which may create a positive value for chroma key operations.

Combinatorial logic 280 receives the outputs of registers 272, 274, 276 and 278. Combinatorial logic 280 defines programmable boolean conditions, which are set by, for example, registers 263 loaded from the video game console address/data bus to thereby select a blending value $K_{1,\ K2}$ or $K_3$ which are programmable and may vary between 0 and 100%. For example, combinatorial logic 280 may be programmed such that, if the luma key 272 is a logical "1" and if the horizontal and vertical pixel clocks indicate that the image is within the defined window, as indicated by the window key, then a predetermined blending value key $K_1$ (or $K_2$ or $K_3$) is to be selected.

In accordance with one exemplary embodiment, chroma keys $K_1$, $K_2$, $K_3$ are shown as inputs to multiplexer 282. $K_1$ or $K_2$ or $K_3$ will be selected based upon the output of combinatorial logic 280, which is coupled to the control input of multiplex 282. Accordingly, combinatorial logic 280 evaluates the outputs of luminance key section 272, chrominance key section 274, saturation key section 276 and window key section 278 under the control of registers 263 to select a value $K_1$, $K_2$, or $K_3$. Multiplexer 284 includes inputs $K_1$, $K_2$, and $K_3$ which are the same $K_1$, $K_2$, and $K_3$ values input to multiplexer 282.

By way of example, presume that a blending value $K_2$ selected by multiplexer 282 represents 70% blending of the video game system data. The counterpart selection in multiplexer 284 is coupled to block 289 which generates a "$1-K_2$" or 100%-70% or 30% blending value. These respective signals are input to variable game amplifiers VGA 286 and 288 whose variable gains are controlled by the selected blending value. Thus, the blending operation would blend 70% of the video game system signal with 30% of the TV video signal from SDRAM 261.

Once outside the selected window, the combinatorial logic 280 selection may result in selecting a $K_1$ blending value rather than $K_2$. If, for example, the chrominance value input to U key 274 became positive at a different time than the luminance luma key 272 output, combinatorial logic 280 may select blending value $K_3$ which may result in a 100% selection of the video game system and no selection of the TV video signal. A wide range of overlay and blending operations beyond those described above will be apparent to those skilled in the art in light of the above description and are contemplated by the present invention.

The outputs of variable gain amplifiers 286 and 288 are mixed at mixer 286. The mixer 286 output is then coupled to NTSC encoder 262 shown in FIG. 6A.

FIGS. 6C and 6D exemplify two of the many possible mixing and overlay screen display results achievable in accordance with the present invention. As shown in FIGS. 6C and 6D, the left most figure in FIGS. 6C and 6D represents the signal from the video game system console 52. The middle figure shows, for example, a broadcast TV display. The figures on the far right show exemplary combined outputs in accordance with the present invention. FIG. 6C shows a relatively simple combination of the video game system and TV picture outputs. In FIG. 6D, although "WEB" is shown on the video game system display screen, it should be understood that any textual message or image may be displayed. The box in the video game system display represents the keying color area. The combined screen in FIG. 6D shows the textual information, where the colored box is replaced with a scaled-down version of the three people represented in the TV image. The K value in FIG. 6B may represent, in this case, 100% of the TV tuner signal. However, the tuner signal is scaled down to the picture-in-picture display size shown in FIG. 6D.

Figure 7:
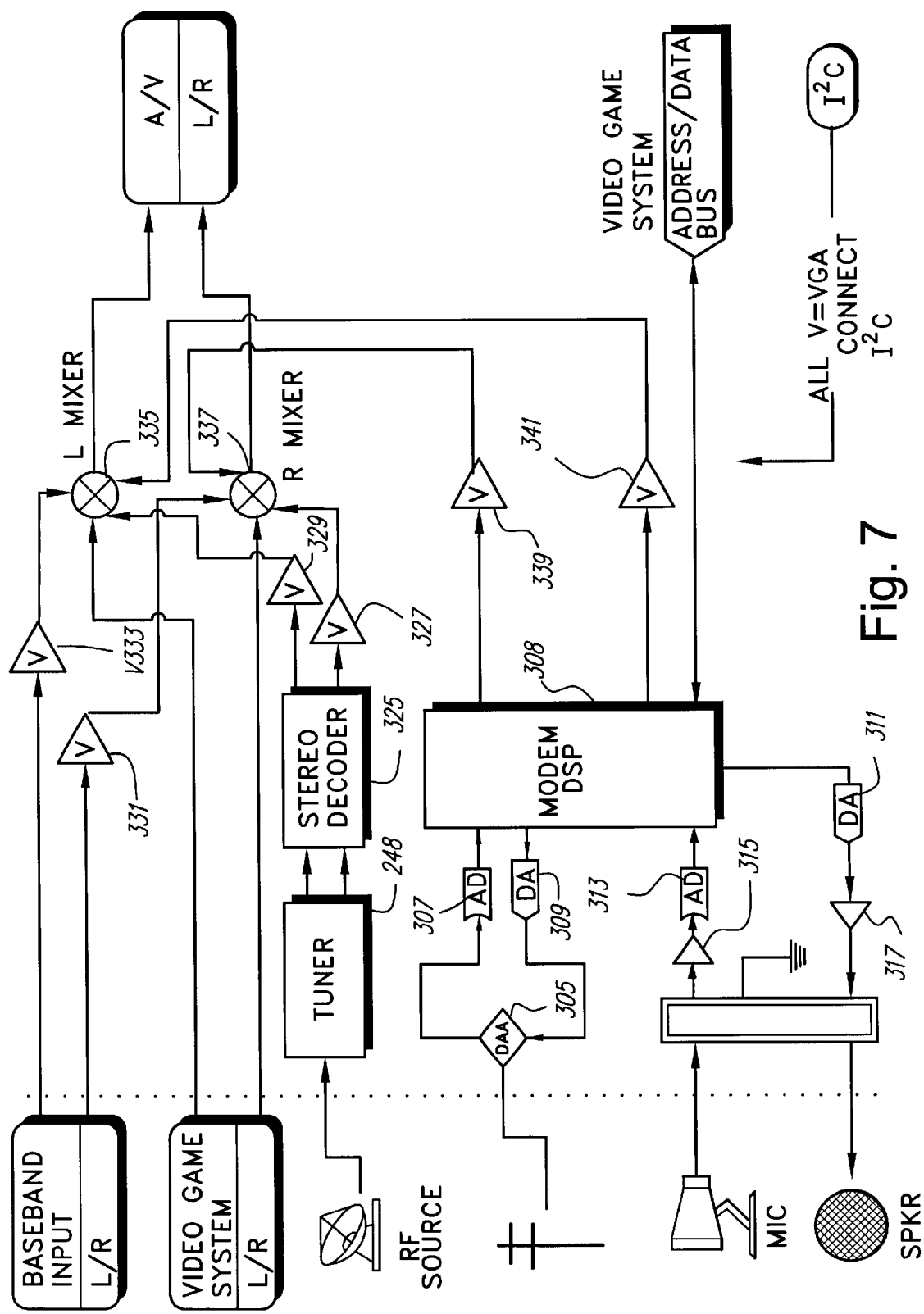
FIG. 7 depicts the audio/modem processing circuit in further detail.

FIG. 7 shows the audio and modem processing circuitry of FIG. 3's block 188. Audio circuit 188 includes a baseband audio/video input for the left and right channels. The baseband input may be an audio signal from a VCR or a cablebox baseband output or Direct Broadcast Satellite or camcorder or other audio source. As shown in FIG. 7, video game system audio/video signals for the left and right channels are also input to audio circuit 188. Additionally, as shown in FIG. 7 an audio signal received from a RF source such as TV, cable or Direct Broadcast Satellite, is input to tuner 248.

The tuner 248 demodulates the signal into an intermediate frequency and inputs the intermediate frequency and a mixing frequency into a stereo decoder 325 that completes the demodulation process and outputs left and right stereo channel signals. The stereo decoder 325 mixes the signals down to provide a baseband signal and separates out the left and right channels which are respectively input to variable gain amplifiers (V) 329 and 327.

Focusing next on the modem related structure, the telephone line is coupled to data access arrangement DAA 305, which includes analog front-end modem circuitry, such as the transformer which couples the signal received over the telephone line to conventional modem processing circuitry. The signal from the telephone line is then coupled to analog-to-digital converter 307 which is in turned coupled to a digital signal processor 308. Digital signal processor 308 executes a modem program which decrypts the data from analog-to-digital converter 307 and couples it to the video game system address/data bus. Data likewise flows in the opposite direction from video game system 50 via the address/data bus to the digital signal processor 308. The received data is processed by DSP 308 to, for example, the appropriate modem V.34 or V.90 format. The data is then converted back to an analog via digital-to-analog converter 309 and coupled to the telephone link via DAA 305.

A microphone input is included whose output is coupled to analog-to-digital converter 313, after being amplified by amplifier 315. DSP 308 processes the digitized microphone data which is then converted to analog data in digital-to-analog converter 311. This microphone data may then be fed back to the FIG. 7 speaker through amplifier 317.

Alternatively, the digitized microphone data from converter 313 may be coupled to video game system 50 via the DSP 308 and the Address/Data bus. In this fashion, the user may record voice data and store it on hard drive 206 and use such data if desired in conjunction with conventional speech processing software.

Audio information may be fed to the speaker through amplifier 317 either from video game system 50 or alternatively from within the expansion device itself. Mixing may occur in either of the video game 50 or the expansion device 95.

Audio circuit 188 also includes left and right channel mixers 335, 337 which mix the following input signals. Modem DSP 308 has left and right channel outputs which are respectively coupled to left channel mixer 335, and right channel mixer 337 through variable gain amplifiers 341 and 339. The above-described baseband left and right channel inputs are respectively coupled via variable gain amplifiers 333 and 331 to left channel mixer 335 and right channel mixer 337. The baseband tuner 248 input is coupled to the mixers 335 and 337 via variable gain amplifiers 329 and 327. The video game system left and right channel inputs are coupled to left and right channel mixers 335 and 337 without being amplified. All other components are coupled to the mixers through variable gain amplifiers so that the signals are controllably amplified relative to the video game system signals.

Left channel mixer 335 and right channel mixer 337 serve as summing junctions to combine the respective input signals. The gain of all the variable gain amplifiers shown in FIG. 7 are controlled via signals received via the I²C bus control input.

The outputs from left channel mixer 335 and right channel mixer 337 are coupled to the audio/video output of a home TV or alternatively, as shown in FIG. 1C to a VCR and then to a TV. The left and right channel outputs are coupled to the modulator 61 shown in FIG. 1C through the A/V output shown in FIG. 7.

As shown in FIG. 7, the baseband, video game system and tuner inputs are mixed by mixers 335 and 337 and coupled to the audio/video output connector. The modem DSP 308 can receive audio signals received through the phone line via DAA 305 or alternatively, voice signals may be input through the microphone input. The voice signal may be mixed with other received signals or may be routed through the speaker to thereby enable the system to act, for example, as a speaker phone. Additionally, as shown in FIG. 7, the modem DSP has a digital connection to the video game system through the address/data bus. This allows audio information to be digitized and passed to the video game system. Audio information may also coupled to the modem DSP from the video game system address/data bus.

Using the system shown in FIG. 7, either analog or digital data may be coupled to the telephone lines. Analog data may also be coupled locally to the associated speaker which may be a speaker phone or phoneset. Analog data may be received via the microphone and coupled to the video game system 50 or alternatively out to the modem (shown in FIG. 7 as DAA 305 AD 307, DA 309, DSP 308). In addition to the audio output from the video game system 50, the audio output component from a TV source may be coupled to the audio processing system via the tuner 248 path shown in FIG. 7. With the audio processing circuitry shown in FIG. 7, in accordance with a further embodiment of the present invention, it is contemplated that the system may function as a telephone answering device and/or include features such as caller ID, DSVD, Radish VoiceView, and support speaker phone operation.

FIG. 8 is an exemplary video game system 50 memory map, which shows an exemplary set of memory locations which are available for the expansion device described herein. The video game system 50 is an I/O memory mapped system. The memory map identifies the name of the register associated with a location or a set of locations assigned to particular addresses (not shown). The read/write status of the locations and a description of the information stored at the location are shown in FIG. 8.

As shown in the FIG. 8 memory map, a location is reserved for storing the Disk Status so that it can be determined if the disk is available to be read. The memory map also provides for a logical block address LBA for reading or writing. Writing to the LBA Write Address location causes the contents of the sector buffer to be written to the logical block address pointed to by the LBA write address. Similarly, writing to the LBA Read Address causes the contents of the logical block address pointed to by the LBA read address to be read into the sector buffer. With respect to each of the LBA read and write address operations, the sector buffer counter is reset.

The Interrupt Status Register identifies, for example, which peripheral devices need service in response to a generated interrupt signal. The exemplary contents of an Interrupt Status Register is shown in FIG. 9.

As shown in FIG. 9, a bit in the Interrupt Status Register indicates when modem data is ready to be read and a further bit indicates when there is modem data ready to send. Additional modem related bits may be included as will be appreciated by those skilled in the art, to provide, for example, a carrier detect bit or a data overrun bit. The RTC Alarm bit is an alarm bit which is set from the real time clock. The video circuit 176 which utilizes the I²C bus described above may generate interrupts and a bit indicative of such an interrupt is shown in FIG. 9. An interrupt also may be generated when Intercast data must be read from the vertical blanking interval and an intercast interrupt bit is shown in FIG. 9.

The Interrupt Status Register also includes various disk-related status indicators. The Disk Read Data Ready bit indicates that there is data in the disk buffer to be read. A Disk Write Completed bit indicates that the disk buffer is presently clear for writing. The Counter At Zero bit indicates whether the buffer counter is at zero. The buffer counter is utilized, for example, in controlling DMA data transfers.

Turning back to the FIG. 8 memory map, the Modem In and Modem Out locations indicate whether modem data is to be read or written and the associated modem status. Modem In relates to data coming into the video game system from the modem and Modem Out relates to data which is sent out by the video game system to the modem. The Modem Out Control location provides for modem control bits for controlling modem operations.

Also shown in FIG. 8 are various I²C bus related address, data and control registers, which are utilized to implement the communication between components connected via I²C bus.

Additionally, shown in FIG. 8 is the, for example, 512 byte register referred to as the sector buffer, which is read and written in order to send data back and forth to and from the hard drive 206. Once 512 bytes are written to the sector buffer, the data is, for example, forwarded to the hard drive DSP controller 194 and then coupled to the hard drive. When an LBA read operation is performed, the LBA read address is set which informs the hard drive to be ready for data and which triggers an interrupt. As indicated in FIG. 9, this interrupt indicates that data is ready to be read.

Address space is additionally allocated to the Video/Intercast space. In this memory space, the video data or intercast data, which is, for example, stored in SDRAM 261 of FIG. 5A may be accessed.

Merely because a component has not been described above in conjunction with the memory maps of FIGS. 9 and 10 should not be interpreted as an indication that the component is not directly addressable. For example, the video game system 50 also includes in its address space, memory locations reserved for game cartridge ROMs, various system resources, the video game system coprocessor and other system components.

Figure 10:
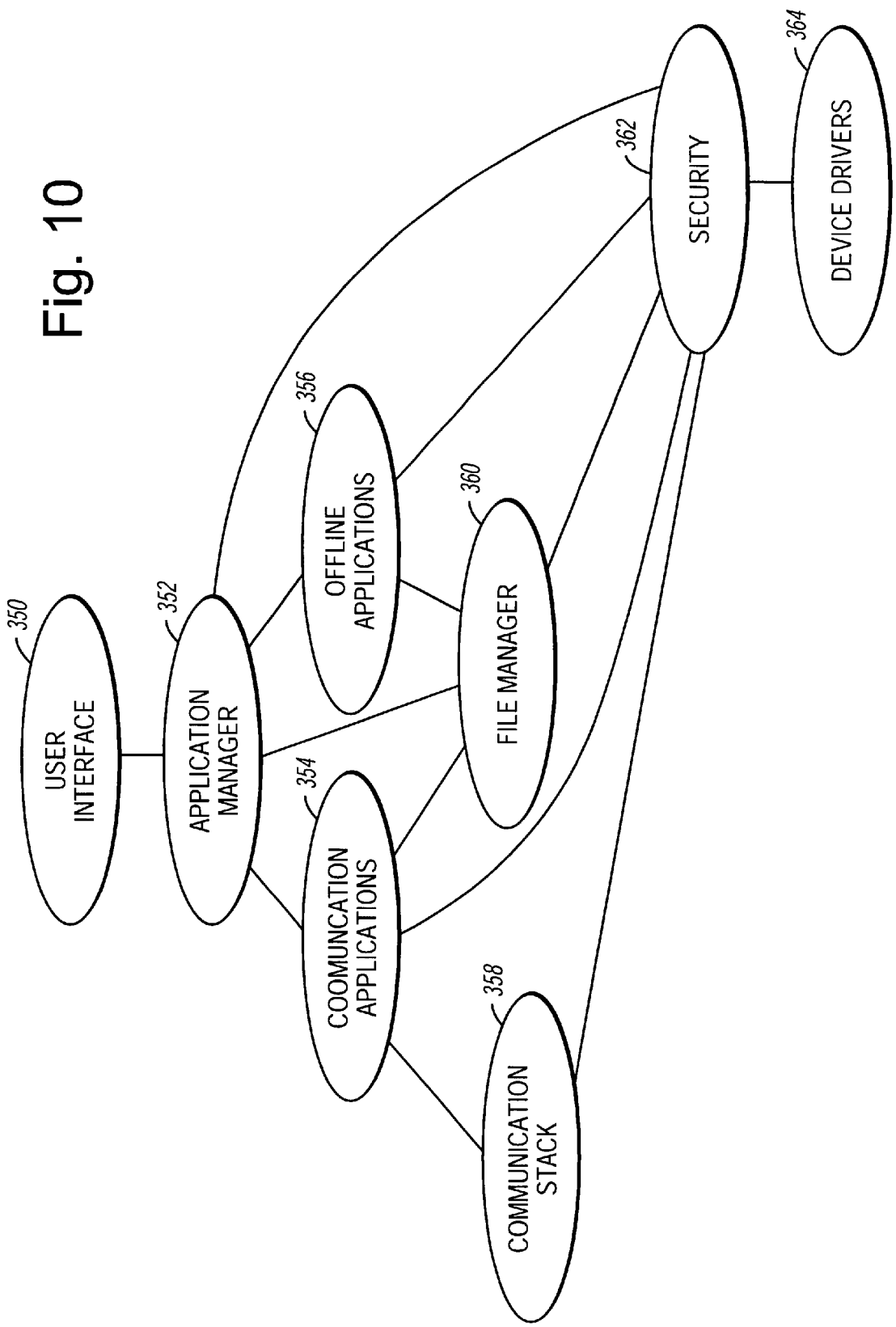
FIG. 10 is a block diagram of system software modules in accordance with the present exemplary embodiment.

FIG. 10 is a block diagram of exemplary system software modules which may be utilized in conjunction with the present exemplary embodiment. The user interface 350 is the user interface which permits a user to select features provided by the application manager 352. The user interface therefore presents to the user a set of selectable operations.

The application manager 352 is the module which controls which applications are executed and which are not. Additionally, it exercises control over the file management system 360.

As described above, some of the applications that may be run in the video game system 50 as expanded by expansion device 95 are communications applications, which are controlled by a communications applications module 354. Such applications include an Internet browser, which may, for example, be a conventional browser providing e-mail and other capabilities appreciated by those skilled in the art.

The system also provides for off-line applications controlled by an Off-line Applications module 356. Module 356 provides calculator, word processor, TV guide and other applications. With respect to the TV guide off-line application, the TV guide may, for example, be accessed via the Internet. Once the TV guide is resident in hard drive 206, the Off-line Applications module 356 manages the various operations performed with respect to the TV guide data.

As shown in FIG. 10, all applications have access to File Manager module 360. File Manager 360 controls the files which are stored on hard drive 206 or other mass memory module utilized in the system. The File Manager 360 must in turn pass through the security layer controlled by the Security module 362 before decryption of data stored in the disk is possible.

Additionally, as shown in FIG. 10, a communications stack module 358 is included, which includes the standard PPP, TCIP and the secure sockets layer (SSL), which are standards necessary for communicating securely over the Internet.

The Security module 362 has access to the various drivers which communicate with the disk drive and the modem. Device drivers 364 include low level device controlling software, which controls, for example, how modem buffers are filled, which sectors are written to on the disk.

Figure 11:
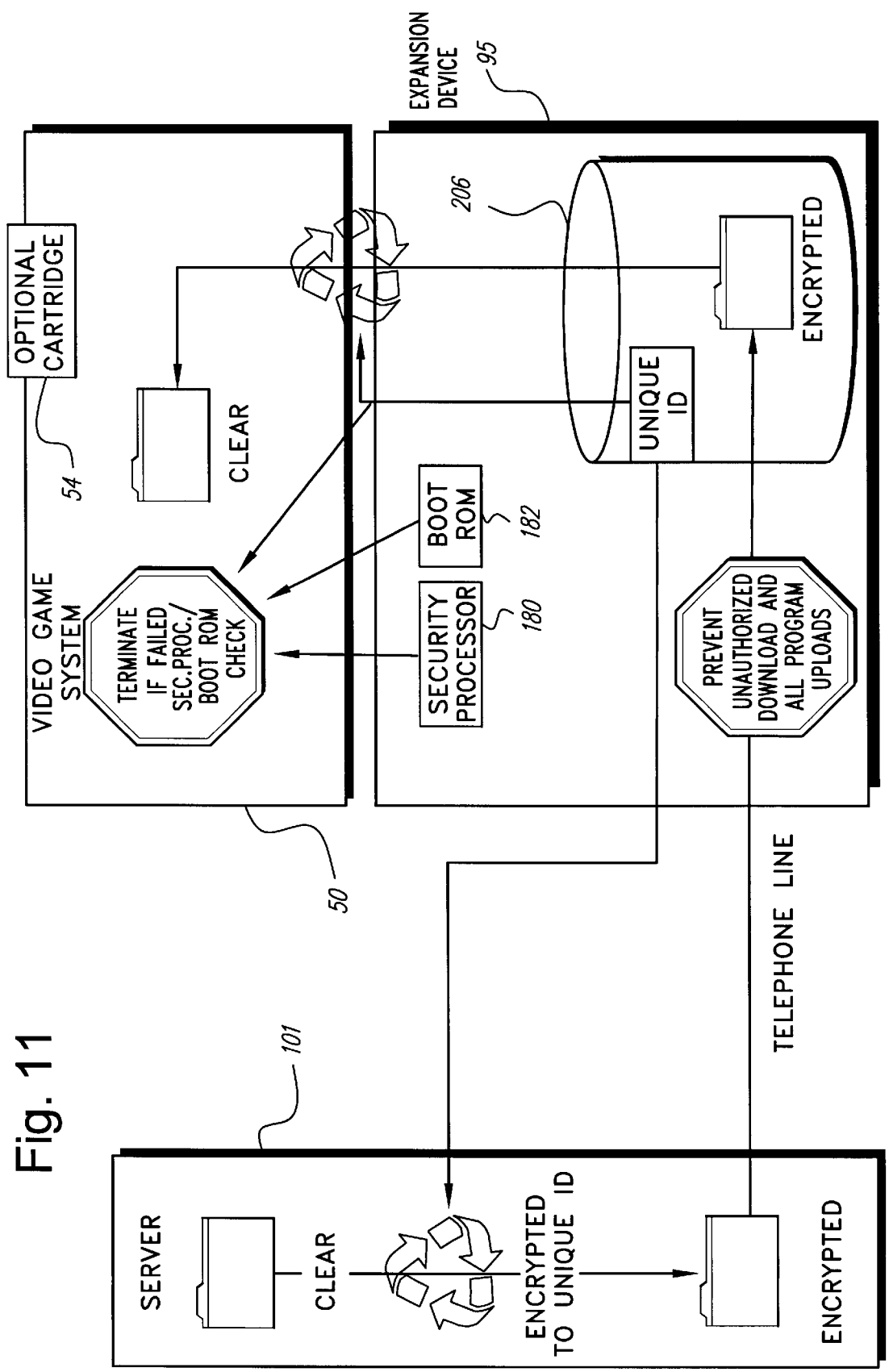
FIG. 11 is an exemplary block/flow diagram of security features which may be utilized in the illustrative embodiments.

FIG. 11 is a block/flow diagram of an exemplary representation of security features which may be utilized in conjunction with the present illustrative embodiments. As will be appreciated by those skilled in the art, a wide variety of alternative variations of the security measures described below also may be advantageously utilized. As shown in FIG. 11, video game system 50 enhanced by expansion device 95 is coupled to a server 101 via a telephone line link.

System security in accordance with the exemplary embodiments rely upon multiple independent levels of security. The security features described below are preferably utilized in addition to encryption available via the Internet, such as RSA's secure socket layer (SSL) and the password login security check associated with establishing an Internet connection.

Security protection features are desirable particularly for Internet access related modes of operation. In accordance with one possible mode of operation, a user may wish to purchase and download a new software package from a vendor's web site. During such a transaction, a screen is displayed for the user, giving the user an option to, for example, purchase particular game software.

In accordance with one exemplary embodiment, a set of public keys are exchanged between the hard drive DSP controller 194 (FIG. 4) and server 101 (FIG. 11) under the control of the video game system processor system. To download a game, video game system 50 sends a request to the hard drive controller 194 for a set of keys with which to encrypt. A private encryption key is then transmitted to server 101 in encrypted form. The server 101 encrypts the game software with the encryption key and transmits the game software for storage in hard drive 206 after processing by the video game system 50.

In order to play the game, a unique session key is transmitted to video game system 50 after being appropriately encrypted by, for example, the hard drive DSP controller 194. The video game system 50 decrypts the session key for the particular session.

Security processor 180 and boot ROM 182 provide additional security layers particularly during power-up authentication, the operation of which varies depending upon the startup operating mode. For example, video game system 50, as enhanced by expansion device 95, may execute the program resident in a video game cartridge 54, which has not been programmed to take advantage of expansion device 95 functionality. If so, DSP controller 194 recognizes that a cartridge 54 is attached, and disables expansion device 95 for security reasons to prevent the designer of a malevolent cartridge from infecting expansion device 95. In this mode of operation, the required security authentication involving security processor 180 will not be successfully completable due, for example, to the failure to appropriately communicate with security processor 180.

In the mode of operation where video game system 50 and expansion device 95 are utilized without a game cartridge 54, in accordance with an exemplary embodiment of the present invention, the following security processing steps may take place. Initially, a check is made as to whether communication is established between a security processor 180 and a game cartridge security processor 152 (FIG. 2). In this operational mode, no such communication will be established, and an attempt is made to communicate between security processor 180 and a security processor associated with hard drive 206. If the security check between security processor 180 and the security processor associated with the hard drive 206 is successful, then boot ROM 182 is accessed.

Initialization code in the boot ROM is executed to, for example, perform further security check and self test functions. In one embodiment of the present invention, the contents of boot ROM 182 is encrypted. If the boot ROM security check is successful, the boot ROM information is decrypted, authentication information is then exchanged between the expansion device 95 boot ROM and the video game system console in, for example, the form of authentication certificates containing information necessary for authentication to take place. In an exemplary embodiment, the certificates are stored in DSP controller 194, which preferably is operable to generate and authenticate certificates.

Resident in boot ROM 182 is a set of instructions which permits the remainder of the expansion device operating system to be accessed. After authentication has occurred, the operating system stored in hard drive 206 is accessed. The operating system of the video game system 50 is likewise authenticated so that the presence of authentic code in both the video game system and expansion device is verified.

In an exemplary embodiment of the present invention, video games resident on hard drive 206 are encrypted. Any of various available encryption algorithms may be utilized in order to obtain the desired degree of security.

DSP controller 194 accesses encrypted information stored on hard drive 206 and transmits such encrypted information to video game system 50 such that multibyte sectors are received by video game system 50. In video game system 50, the information is decrypted.

Each manufactured hard drive 206 has a unique ID associated therewith which can't be read by a user. When a game is downloaded to the hard drive 206, the encrypted unique ID is coupled to DSP controller 194 and in turn passed to the server via video game system 50. The server uses the unique ID as a key to encrypt the game in accordance with an encryption algorithm. In accordance with one embodiment of the present invention, each purchased game may be uniquely encrypted. A downloaded game is received by video game system 50 where the game is decrypted and executed and stored in encrypted form on hard drive 206.

After such initial security checks are made, a display is generated showing various user options. By way of example only, the user will have the option of choosing an Internet browser, any games that have been loaded on the hard drive 206, and a range of selectable application programs (which may be as comprehensive as desired and may, for example, include a calculator, a word processor, etc.). From the options screen, a user may initiate any of the selections by, for example, a predefined game controller or keyboard (if any is attached) operation.

If the user selects an Internet browser, the application manager program loads the browser from hard drive 206 to the video game system console 52. The user is then prompted for password entry. After password entry processing, the video game processor instructs modem 186 to pick up the phone, dial the Internet service provider's designated number and attempt to make the connection and execute the required code to establish communication.

After the initial connection is established, the user name and password is transmitted and authentication takes place by the server to confirm communication with a registered user. Internet communication is established in a conventional manner as will be understood by those skilled in the art. Session information is exchanged and software is executed to appropriately update the browser, after which the user may utilize the Internet as desired.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

We claim:

1. A home video game system for executing video game programs and for generating game play graphics in response to player controller control signals generated by a player operating a player controller for display on a user's television, said home video game system including a removable memory insertion port for receiving a removable memory storing video game program instructions, comprising:
   a game processing system including a main processor, operatively coupled to receive video game instructions from said removable memory for executing a video game program, and a graphics coprocessor for processing-graphics information under control of said main processor, and being responsive to said player controller control signal for generating game play graphics for display on a user's television;
   communications circuitry, coupled in use to said game processing system and to a user's communications network, for linking said game processing system to the Internet;
   a writeable mass storage device coupled in use to said game processing system for receiving information downloaded from the Internet;
   cryptographic processing circuitry, coupled to said mass storage device, for decrypting at least some of said information downloaded from the Internet; and
   video generating circuitry for receiving an RF input signal having an audio component and a video component and for generating graphics data for display on said user's television.

2. The home video game system of claim 1 wherein said mass storage device comprises a hard disk which stores a network browser program.

3. A home video game system for executing video game programs and for generating game play graphics in response to player controller control signals generated by a player operating a player controller for display on a user's television, said home video game system including a removable memory insertion port for receiving a removable memory storing video game program instructions, comprising:
   a game processing system including a main processor, operatively coupled to receive video game instructions from said removable memory for executing a video game program, and a graphics coprocessor for processing graphics information under control of said main processor, and being responsive to said player controller control signal for generating game play graphics for display on a user's television;
   communications circuitry, coupled in use to said game processing system and to a user's communications network, for linking said game processing system to the Internet;
   a writeable mass storage device coupled in use to said game processing system for receiving information downloaded from the Internet;
   cryptographic processing circuitry, coupled to said mass storage device, for decrypting at least some of said information downloaded from the Internet;
   a tuner for receiving television signals; and
   video generating circuitry for selectively coupling television signals and said game play graphics for output and display on a user's television.

4. A home video game system according to claim 3, wherein said video generating circuitry includes circuitry combining said television signals and said game play graphics for output and display on said user's television.

5. A home video game system according to claim 4, wherein said video generating circuitry includes picture-in-picture display circuitry for generating a picture-in-picture display on said user's television.

6. A home video game system according to claim 5, wherein said picture-in-picture display circuitry is operable to generate a picture-in-picture display having a programmable size.

7. A home video game system according to claim 5, wherein said picture-in-picture display circuitry is operable to generate a picture-in-picture display having a programmable position.

8. A home video game system according to claim 4, wherein said video generating circuitry is operable to combine real time television signals with video game graphics, whereby a user may simultaneously watch a television broadcast and play at least part of a video game.

9. A home video game system for executing video game programs and for generating game play graphics in response to player controller control signals generated by a player operating a player controller for display on a user's television, said home video game system including a removable memory insertion port for receiving a removable memory storing video game program instructions, comprising:
   a game processing system including a main processor, operatively coupled to receive video game instructions from said removable memory for executing a video game program, and a graphics coprocessor for processing graphics information under control of said main processor, and being responsive to said player controller control signal for generating game play graphics for display on a user's television;

communications circuitry, coupled in use to said game processing system and to a user's communications network, for linking said game processing system to the Internet;

a writeable mass storage device coupled in use to said game processing system for receiving information downloaded from the Internet;

cryptographic processing circuitry, coupled to said mass storage device, for decrypting at least some of said information downloaded from the Internet;

a tuner for receiving television signals; and video generating circuitry, coupled to said tuner and said communications circuitry for simultaneously displaying television signals and informnation received from the Internet.

10. A home video game system for executing video game programs and for generating game play graphics in response to player controller control signals generated by a player operating a player controller for display on a user's television, said home video game system including a removable memory insertion port for receiving a removable memory storing video game program instructions, comprising:

a game processing system including a main processor, operatively coupled to receive video game instructions from said removable memory for executing a video game program, and a graphics coprocessor for processing graphics information under control of said main processor, and being responsive to said player controller control signal for generating game play graphics for display on a user's television;

communications circuitry, coupled in use to said game processing system and to a user's communications network, for linking said game processing system to the Internet;

a writeable mass storage device coupled in use to said game processing system for receiving information downloaded from the Internet;

cryptographic processing circuitry, coupled to said mass storage device, for decrypting at least some of said information downloaded from the Internet;

a tuner for receiving television signals; and control circuitry for responding to remotely generated channel changing signals for coupling channel changing commands to said tuner.

11. A home video game system according to claim 1, further including audio circuitry coupled to said video game processing system.

12. A home video game system according to claim 1, wherein said communications circuitry and said mass storage device are housed in an expansion device and said video game processing system is housed in a separate video game console which is coupled to said expansion device.

13. A home video game system according to claim 1, wherein said communications circuitry comprises a modem, and further including a controller for controlling said mass storage device and said modem.

14. A home video game system according to claim 1, wherein said mass storage device is a flash memory storage device.

15. A home video game system comprising:

a removable memory insertion port for receiving a removable memory storing video game program instructions, a game processing system including a main processor, operatively coupled to receive video game instructions from said removable memory and a graphics coprocessor for processing graphics information under control of said main processor for executing a video game program and generating game play graphics for display on a user's television in response to player controller control signals generated by a player operating a player controller:

communications circuitry, coupled, in use, to said game processing system and to a users communications network for linking said game processing system to the Internet;

video generating circuitry for combining game play graphics and signals received via the Internet for display on the user's television, a writeable mass storage device coupled in use to said game processing system for receiving information downloaded from the Internet and for storing at least some of said information in encrypted form;

a microcontroller coupled to said communications circuitry and said writeable mass storage device for controlling at least said writeable mass storage device and said communications circuitry;

a tuner for receiving television signals; and video generating circuitry for selectively coupling television signals and signals received via the Internet for display on a user's television.

16. Apparatus according to claim 15, wherein said writeable mass storage device for is a hard disk drive and stores a network browser program.

17. Apparatus according to claim 15, wherein said video generating circuitry includes picture-in-picture display circuitry for generating a picture-in-picture display on said user's television.

18. Apparatus according to claim 17, wherein said picture-in-picture display circuitry is operable to generate a picture-in-picture display having a programmable size.

19. Apparatus according to claim 17, wherein said picture-in-picture display circuitry is operable to generate a picture-in-picture display having a programmable position.

20. Apparatus according to claim 15, wherein said video generating circuitry is operable to combine real time television signals with video game graphics, whereby a user may simultaneously watch a television broadcast and access the Internet.

21. Apparatus according to claim 15, wherein the video generating circuitry, coupled to said tuner and said communications circuitry, is configured to simultaneously display television signals and information received from the Internet.

22. A home video game system comprising:

a removable memory insertion port for receiving a removable memory storing video game program instructions, a game processing system including a main processor, operatively coupled to receive video game instructions from said removable memory and a graphics coprocessor for processing graphics information under control of said main processor for executing a video game program and generating game play graphics for display on a user's television in response to player controller control signals generated by a player operating a player controller:

communications circuitry, coupled, in use, to said game processing system and to a users communications network for lining said game processing system to the Internet;

video generating circuitry for combining game play graphics and signals received via the Internet for display on the user's television, a writeable mass storage device coupled in use to said game processing system for receiving information downloaded from the Internet and for storing at least some of said information in encrypted form;

a microcontroller coupled to said communications circuitry;

said writeable mass storage device for controlling at least said writeable mass storage device and said communications circuitry;

a tuner for receiving television signals; and control circuitry for responding to remotely generated channel changing signals for coupling channel changing commands to said tuner.

23. Apparatus according to claim 15, further including audio circuitry coupled to said video game processing system.

24. Apparatus according to claim 15, wherein said communications circuitry and said video generating device are housed in an expansion device which is coupled to said video game processing system which is housed in a separate video game console.

25. Apparatus according to claim 16, wherein said communications circuitry comprises a modem, and wherein said microcontroller controls said hard disk drive and said modem.

26. A method of operating a home video game system having a game processing system including a main game processor and a graphics coprocessor for executing a video game program and for accessing the Internet, said home video game system including a writeable mass storage device and a modem, comprising:

generating game play graphics by the home video game processing system under the control of a main game processor and a graphics coprocessor for display on a user's television;

accessing the Internet via the modem;

controlling the modem using a microcontroller;

downloading information from the Internet to the home video game system;

writing said information downloaded from the Internet to said mass storage device under the control of the microcontroller controlling said modem;

decrypting at least some of said information downloaded from the Internet and stored in said mass storage device;

receiving television signals and coupling said televisions signals to a tuner embodied within said home video game system; and selectively coupling television signals and said game play graphics for display on a user's television.

27. A method for operating a home video game system according to claim 26, further comprising:

mixing said television signals and said game play graphics for display on said user's television.

28. A method for operating a home video game system according to claim 26, further including the step of generating a picture-in-picture display on said user's television using said information downloaded from the Internet and said game play graphics.

29. A method for operating a home video game system according to claim 28, wherein said step of generating a picture-in-picture display on said user's television includes the step of generating a picture-in-picture display having a programmable size.

30. A method for operating a home video game system having a game processing system including a main game processor and a graphics coprocessor for executing a video game program and for accessing the Internet, said home video game system including a writeable mass storage device and a modem, comprising:

generating game play graphics by the home video game processing system under the control of a main game processor and a graphics coprocessor for display on a user's television;

accessing the Internet via the modem;

controlling the modem using a microcontroller;

downloading information from the Internet to the home video game system;

writing said information downloaded from the Internet to said mass storage device under the control of the microcontroller controlling said modem; and decrypting at least some of said information downloaded from the Internet and stored in said mass storage device;

receiving television signals and coupling said signals to a tuner associated with said home video game system; and combining real time television signals with video game graphics, whereby a user may simultaneously watch a television broadcast and play at least part of a video game.

31. A method for operating a home video game system having a game processing system including a main game processor and a graphics coprocessor for executing a video game program and for accessing the Internet, said home video game system including a writeable mass storage device and a modem, comprising:

generating game play graphics by the home video game processing system under the control of a man game processor and a graphics coprocessor for display on a user's television;

accessing the Internet via the modem;

controlling the modem using a microcontroller;

downloading information from the Internet to the home video game system;

writing said information downloaded from the Internet to said mass storage device under the control of the microcontroller controlling said modem; and decrypting at least some of said information downloaded from the Internet and stored in said mass storage device;

receiving television signals and coupling said signals to a tuner associated with said home video game system; and simultaneously displaying television signals and information received from the Internet.

32. A method for operating a home video game system having a game processing system including a main game processor and a graphics coprocessor for executing a video game program and for accessing the Internet, said home video game system including a writeable mass storage device and a modem, comprising:

generating game play graphics by the home video game processing system under the control of a main game processor and a graphics coprocessor for display on a user's television;

accessing the Internet via the modem;

controlling the modem using a microcontroller;

downloading information from the Internet to the home video game system;

writing said information downloaded from the Internet to said mass storage device under the control of the microcontroller controlling said modem; and decrypting at least some of said information downloaded from the Internet and stored in said mass storage device;

receiving television signals and coupling said signals to a tuner associated with said home video game system; and responding to remotely generated channel changing signals for coupling channel changing commands to said tuner.

33. A home video game system comprising:

a removable memory insertion port for receiving a removable memory storing video game program instructions, a game processing system including a main processor, operatively coupled to receive video game instructions from said removable memory and a graphics coprocessor for processing graphics information under control of said main processor for executing a video game program and generating game play graphics for display on a user's television in response to player controller control signals generated by a player operating a player controller, communications circuitry, coupled in use to a user's communications network for linking said home video game circuitry to the Internet;

an address and data bus coupled in use to said game processing system;

a digital signal processor coupled to said communications circuitry and said address and data bus for processing information received via said communications circuitry from said user's communications network and for coupling processed information to said address and data bus;

an audio input for receiving audio input signals;

said digital signal processor for receiving data indicative of said audio input signals and for processing said audio input signals;

a writeable mass storage device coupled to said address and data bus for receiving information downloaded from the Internet and for storing at least some of said information in encrypted form; and video generating circuitry for receiving an RP input signal having an audio component and a video component and for generating graphics data for display on said user's television, said video generating circuitry coupling said audio component to said audio input.

34. Apparatus according to claim 33, wherein said audio input is an analog microphone input, and an analog to digital converter coupled to said digital signal processor for converting the analog microphone input to a digitized microphone data, said digitized microphone data being coupled to said digital signal processor.

35. Apparatus according to claim 33, further including an audio output coupled to said digital signal processor via an digital to analog converter.

36. Apparatus according to claim 35, wherein said audio output is coupled to receive the audio output of said video game processing system.

37. Apparatus according to claim 33, wherein said digital signal processor generates audio output signals, further including mixing circuitry for mixing video game system generated audio signals and said audio output signals generated by said digital signal processor.

38. Apparatus according to claim 33, further including an audio output coupled to said digital signal processor via an digital to analog converter, said video game processing system generating an audio output, said digital signal processor being coupled to receive and being operable to process said video game processing system audio output.

39. Apparatus according to claim 38, wherein the processed audio output of said video game processing system audio output results in a special audio effect.

40. Apparatus according to claim 33, wherein said writeable mass storage device stores a network browser program.

41. Apparatus according to claim 33, wherein said video game processing system is configured to generate an audio output, and further comprising:

audio circuitry for mixing said audio component and the audio output of said video game processing system.

42. A home video game system comprising:

a removable memory insertion port for receiving a removable memory storing video game program instructions, a game processing system including a main processor, operatively coupled to receive video game instructions from said removable memory and a graphics coprocessor for processing graphics information under control of said main processor for executing a video game program and generating game play graphics for display on a user's television in response to player controller control signals generated by a player operating a player controller, communications circuitry, coupled in use to a user's communications network for linking said home video game circuitry to the Internet;

an address and data bus coupled in use to said game processing system;

a digital signal processor coupled to said communications circuitry and said address and data bus for processing information received via said communications circuitry from said user's communications network and for coupling processed information to said address and data bus;

an audio input for receiving audio input signals;

said digital signal processor receiving data indicative of said audio input signals and for processing said audio input signals and a writeable mass storage device coupled to said address and data bus for receiving information downloaded from the Internet and for storing at least some of said information in encrypted form; and a tuner; and video generating circuitry, coupled to said tuner and said communications circuitry, for selectively displaying television signals and information received from the Internet on said user's television.

43. A home video game system comprising:

a removable memory insertion port for receiving a removable memory storing video game program instructions, a game processing system including a main processor, operatively coupled to receive video game instructions from said removable memory and a graphics coprocessor for processing graphics information under control of said main processor for executing a video game program and generating game play graphics for display on a user's television in response to player controller control signals generated by a player operating a player controller, communications circuitry, coupled in use to a user's communications network for linking said home video game circuitry to the Internet;

an address and data bus coupled in use to said game processing system;

a digital signal processor coupled to said communications circuitry and said address and data bus for processing information received via said communications circuitry from said user's communications network and for coupling processed information to said address and data bus;

an audio input for receiving audio input signals;

said digital signal processor receiving data indicative of said audio input signals and for processing said audio input signals and a writeable mass storage device coupled to said address and data bus for receiving information downloaded from the Internet and for storing at least some of said information in encrypted form; and video generating circuitry coupled to said address and data bus for generating a picture-in-picture display on said user's television.

44. A home video game system comprising:

a removable memory insertion port for receiving a removable memory storing video game program instructions, a game processing system including a main processor, operatively coupled to receive video game instructions from said removable memory and a graphics coprocessor for processing graphics information under control of said main processor for executing a video game program and generating game play graphics for display on a user's television in response to player controller control signals generated by a player operating a player controller, communications circuitry, coupled in use to a user's communications network for linking said home video game circuitry to the Internet;

an address and data bus coupled in use to said game processing system;

a digital signal processor coupled to said communications circuitry and said address and data bus for processing information received via said communications circuitry from said user's communications network and for coupling processed information to said address and data bus;

an audio input for receiving audio input signals;

said digital signal processor receiving data indicative of said audio input signals and for processing said audio input signals and a writeable mass storage device coupled to said address and data bus for receiving information downloaded from the Internet and for storing at least some of said information in encrypted form;

a television signal tuner; and video generating circuitry operable to combine real time television signals with video game graphics, whereby a user may simultaneously watch a television broadcast and play a video game.

45. A home video game system comprising:

a removable memory insertion port for receiving a removable memory storing video game program instructions, a game processing system including a main processor, operatively coupled to receive video game instructions from said removable memory and a graphics coprocessor for processing graphics information under control of said main processor for executing a video game program and generating game play graphics for display on a user's television in response to player controller control signals generated by a player operating a player controller, an expansion module including communications circuitry, coupled in use to said game processing system and to a user's communications network for linking said game processing system to the Internet;

an address and data bus coupled in use to said game processing system;

display generating circuitry coupled to said address and data bus and having a first input for receiving video game play graphics data for display and a second input for receiving digital information for display from a second source, said display generating circuitry being operable to provide at least one of said video game play graphics data and said digital information from said second source for display on the user's television and a read/write mass storage device coupled to said address and data bus for storing information downloaded from the Internet; and cryptographic processing circuitry, coupled to said mass storage device for decrypting at least some of said information downloaded from the Internet.

46. Apparatus according to claim 45, wherein said second source is a source of television signals and further including a tuner for receiving said television signals, said display generating circuitry being operable to selectively couple said television signals and said game play graphics signals for display on a user's television.

47. Apparatus according to claim 45, wherein said display generating circuitry includes picture-in-picture display circuitry for generating a picture-in-picture display on said user's television.

48. A home video game system according to claim 47, wherein said picture-in-picture display circuitry is operable to generate a picture-in-picture display having a programmable size.

49. Apparatus according to claim 46, wherein said display generating circuitry is embodied in said expansion module and is operable to combine real time television signals with signals received via the Internet, whereby a user may simultaneously watch a television broadcast and access the Internet.

50. Apparatus according to claim 45, wherein said display generating circuitry includes programmable mode control circuitry coupled to said address and data bus for setting an output display mode.

51. Apparatus according to claim 45, further including a memory, coupled to said display generating circuitry, for storing graphics data, said graphics data being accessible by said display generating circuitry for use in generating a display on said user's television.

52. Apparatus according to claim 45, wherein said communications circuitry comprises a modem, and further including a keyboard coupled to said video game processing system for use as a text entry input device.

53. Apparatus according to claim 45, wherein said mass storage device is a hard drive storing a network browser program.

54. Apparatus according to claim 45, wherein said mass storage device is a DVD random access memory.

* * * * *